US009414049B2

(12) United States Patent
Gaudreau

(10) Patent No.: US 9,414,049 B2
(45) Date of Patent: Aug. 9, 2016

(54) METHOD AND DISPLAY FOR SHOWING A STEREOSCOPIC IMAGE

(75) Inventor: Jean-Etienne Gaudreau, Longueuil (CA)

(73) Assignee: ÉCRANS POLAIRES INC./POLAR SCREENS INC., Longueuil, Quebec (CA)

( * ) Notice: Subject to any disclaimer, the term of this patent is extended or adjusted under 35 U.S.C. 154(b) by 232 days.

(21) Appl. No.: 14/345,511

(22) PCT Filed: Sep. 9, 2012

(86) PCT No.: PCT/CA2012/000864
§ 371 (c)(1),
(2), (4) Date: Mar. 18, 2014

(87) PCT Pub. No.: WO2013/040683
PCT Pub. Date: Mar. 28, 2013

(65) Prior Publication Data
US 2014/0320614 A1    Oct. 30, 2014

Related U.S. Application Data

(60) Provisional application No. 61/536,217, filed on Sep. 19, 2011, provisional application No. 61/590,542, filed on Jan. 25, 2012, provisional application No. 61/654,150, filed on Jun. 1, 2012.

(51) Int. Cl.
H04N 13/04    (2006.01)
G02B 27/22    (2006.01)
H04N 13/00    (2006.01)

(52) U.S. Cl.
CPC ........ *H04N 13/0402* (2013.01); *G02B 27/2214* (2013.01); *H04N 13/0007* (2013.01);

(Continued)

(58) Field of Classification Search
CPC .......... G02B 27/2214; H04N 13/0007; H04N 13/0402; H04N 13/0409; H04N 13/0413; H04N 13/0468; H04N 2013/0074
USPC .......................................... 348/51
See application file for complete search history.

(56) References Cited

U.S. PATENT DOCUMENTS 2,631,496 A *  3/1953  Rehorn .............. G02B 27/2214
                                                    359/463
5,264,964 A    11/1993  Faris
(Continued)

FOREIGN PATENT DOCUMENTS

EP    2259598 A1    12/2010
JP    3096613 B2    10/2000
WO   98/27451        6/1998

OTHER PUBLICATIONS

Hayashi et al., "A 23-in. full-panel-resolution autostereoscopic LCD with a novel directional backlight system", Journal of the Society Information Display (SID) 18/7, 2010, pp. 507-512.

(Continued)

*Primary Examiner* — Behrooz Senfi
(74) *Attorney, Agent, or Firm* — BCF LLP

(57) ABSTRACT

A method of generating stereoscopic images and an autostereoscopic system are introduced. Stereoscopic images are obtained by generating, on a screen, a first image having a pattern comprising alternating columns of N left-image pixels or sub-pixels and of N right-image pixels or sub-pixels and a second image having a reversed pattern from the pattern of the first image. A parallel-strip barrier has alternating strips for blocking alternating columns of the first and second images. A tracking system provides position information related to a viewer of the stereoscopic image. A controller shifts to the left or to the right, in relation to the strips of the barrier, the image columns by a number of image pixels or sub-pixels as a function of the position of the viewer.

20 Claims, 32 Drawing Sheets

(52) U.S. Cl.
CPC ....... *H04N13/0409* (2013.01); *H04N 13/0413* (2013.01); *H04N 13/0468* (2013.01); *H04N 13/0472* (2013.01); *H04N 13/0477* (2013.01); *H04N 2013/0074* (2013.01)

(56) References Cited

U.S. PATENT DOCUMENTS

| | | | |
|---|---|---|---|
| 5,629,798 | A | 5/1997 | Gaudreau |
| 5,875,055 | A | 2/1999 | Morishima et al. |
| 6,304,288 | B1 | 10/2001 | Hamagishi |
| 7,190,518 | B1 | 3/2007 | Kleinberger et al. |
| 7,705,935 | B2 | 4/2010 | Gaudreau |
| 7,903,332 | B2 | 3/2011 | De Zwart et al. |
| 2006/0061651 | A1 | 3/2006 | Tetterington |
| 2007/0091058 | A1 | 4/2007 | Nam et al. |
| 2009/0224646 | A1 | 9/2009 | Kim et al. |
| 2010/0302351 | A1 | 12/2010 | Yanamoto |
| 2011/0032346 | A1* | 2/2011 | Kleinberger ....... H04N 13/0404 348/59 |
| 2011/0075257 | A1 | 3/2011 | Hua et al. |
| 2011/0102558 | A1 | 5/2011 | Moliton et al. |
| 2013/0257861 | A1* | 10/2013 | Kim ..................... G06T 15/00 345/419 |

OTHER PUBLICATIONS

Kleinberger et al., "A full-time, full-resolution dual stereoscopic/autostereoscopic display OR Rock solid 3D on a flat screen—with glasses or without!", Stereoscopic Displays and Virtual Systems X, Andrew J. Woods, Mark T. Bolas, John O. Merritt, Stephen A. Benton, Editors, Proceedings of SPIE-IS&T Electronic Imaging, SPIE vol. 5006, 2003 pp. 136-144.

Jung et al., "High image quality 3D displays with polarizer glasses based on active retarder technology", Stereoscopic Displays and Applications XXII, edited by Andrew J. Woods, Nicolas S. Holliman, Neil A. Dodgson, Proceedings of SPIE-IS&T Electronic Imaging, SPIE vol. 7863, 78630L, 2011.

Dodgson, "Variation and extrema of human interpupillary distance", Stereoscopic Displays and Virtual Reality Systems I, edited vy Andrew J. Woods, John O. Merritt, Stephen A. Benton, Mark T. Bolas, Proc. of SPIE-IS&T Electronic Imaging, SPIE vol. 5291, 2004, pp. 36-46.

Stolle et al., "Technical solutions for a full-resolution auto-stereoscopic 2D/3D display technology", 2008, Society of Photo-Optical Instrumentation Engineers, Conference Proceedings, vol. 6803 Stereoscopic Displays and Applications XIX.

Peterka et al. "Advances in the Dynallax Solid-State Dynamic Parallax Barrier Autostereoscopic Visualization Display System", IEEE Transactions on Visualization and Computer Graphics, vol. 14, No. 3, May/Jun. 2008, pp. 487-499.

McAllister et al. "Display Technology: Stereo & 3D Display Technologies", Department of Computer Science, North Carolina State University.

Holliman. "3D Display Systems", Department of Computer Science, University of Durham, Science Laboratories, Feb. 2, 2005. http://www.it.uu.se/edu/course/homepage/igs/ht06/lect/F5_display_technologies.pdf.

* cited by examiner

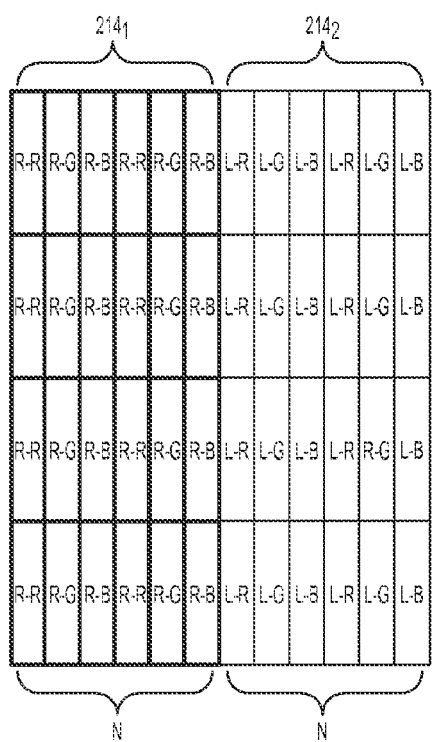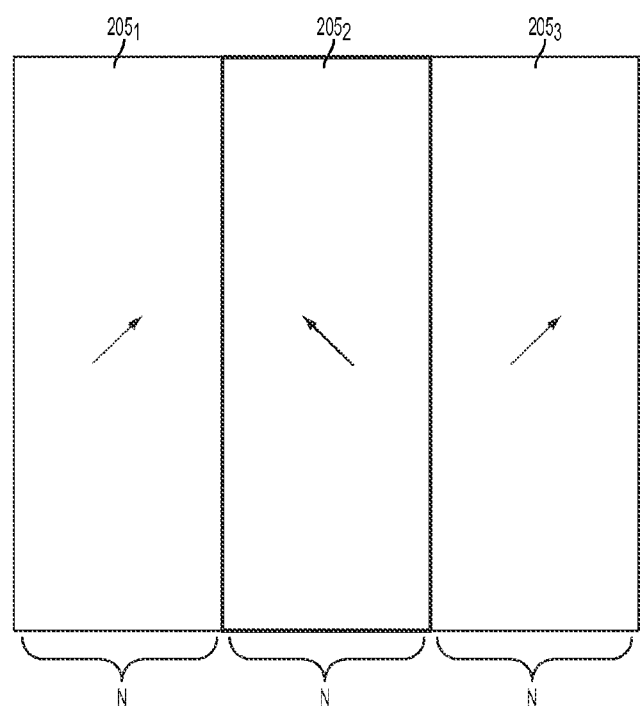
FIG. 6A
FIG. 6B

USER CLOSEST TO SCREEN

USER FAR FROM THE SCREEN

USER CLOSER TO SCREEN

USER VERY FAR FROM THE SCREEN

METHOD AND DISPLAY FOR SHOWING A STEREOSCOPIC IMAGE

TECHNICAL FIELD

The present disclosure relates to the field of electronic displays. More specifically, the present disclosure relates to a method and display for showing a stereoscopic image.

BACKGROUND

Stereoscopic visual displays, also called three-dimensional (3D) displays, are rapidly becoming ubiquitous. These devices are commonly used for viewing 3D movies or for gaming applications. Use of stereoscopic technology may create realistic games or scenery by providing depth to objects through presenting a unique view to each eye of a viewer, in a way approaching a real life viewer experience. In polarization technology 3D TV, linear polarized and circularly polarized lights are used to separate two complementary images. Stereoscopic imaging therefore requires simultaneous display of two complementary images, emitted at distinct polarizations. According to some 3D vision methods, left and right images are displayed alternatively and viewers wear special glasses having distinct filters on the left and right sides, for example shutter glasses, to ensure that each eye perceives a distinct one of the complementary images.

Autostereoscopic display systems do not require a viewer to wear specialized glasses. Some autostereoscopic display systems use head tracking systems or eye tracking systems to actively and adaptively deflect complementary images emitted from a display toward a viewer's left and right eyes.

Conventionally, head tracking autostereoscopic displays offer only half of the available resolution in 3D and may rely either on mechanical lenticular displacement to steer vertical interlaced stereo images to each corresponding eyes or use a controllable barrier with a very small strip, which is a lot smaller than a pixel size. Moreover, complex electro-optical arrangements are required to support 3D and two-dimensional (2D) imaging on the same display.

Therefore, there is a need for methods and devices for displaying 3D images of good resolution without requiring the viewer to wear special glasses while also allowing a viewer freedom of movement.

SUMMARY

According to the present disclosure, there is provided a method for displaying a stereoscopic image. A first image having a pattern comprising alternating columns of N left-image pixels or sub-pixels and of N right-image pixels or sub-pixels is generated. A second image having a reversed pattern from the pattern of the first image is also generated. Alternating columns of the first and second images are blocked in alternating strips of a parallel-strip barrier. The patterns of the first and second images are shifted to the left or to the right, in relation to the strips of the barrier, by a number of image pixels or sub-pixels as a function of a position of a viewer of the stereoscopic image.

According to the present disclosure, there is also provided a display for showing a stereoscopic image. The display comprises a screen, a parallel-strip barrier, a tracking system and a controller of the screen. The screen generates a first image having a pattern comprising alternating columns of N left-image pixels or sub-pixels and of N right-image pixels or sub-pixels. The screen also generates a second image having a reversed pattern from the pattern of the first image. The parallel-strip barrier has alternating strips for blocking alternating columns of the first and second images. The tracking system tracks a position of a viewer of the stereoscopic image. The controller shifts to the left or to the right, in relation to the strips of the barrier, the patterns of the first and second images by a number of image pixels or sub-pixels as a function of the position of the viewer.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which:

FIG. 3 is a block diagram of the stereoscopic display system of FIG. 2a;

FIG. 6a is a schematic, partial view of a second image, polarized at 135 degrees, produced on a 3D screen;

FIG. 6b is another schematic, partial view of the parallel-strip barrier of FIG. 5b;

FIG. 7a is another schematic, partial view of an image produced on a 3D screen;

FIG. 7b shows the effect of a pattern shift by one sub-pixel in the image of FIG. 7a;

DETAILED DESCRIPTION

Figure 1:
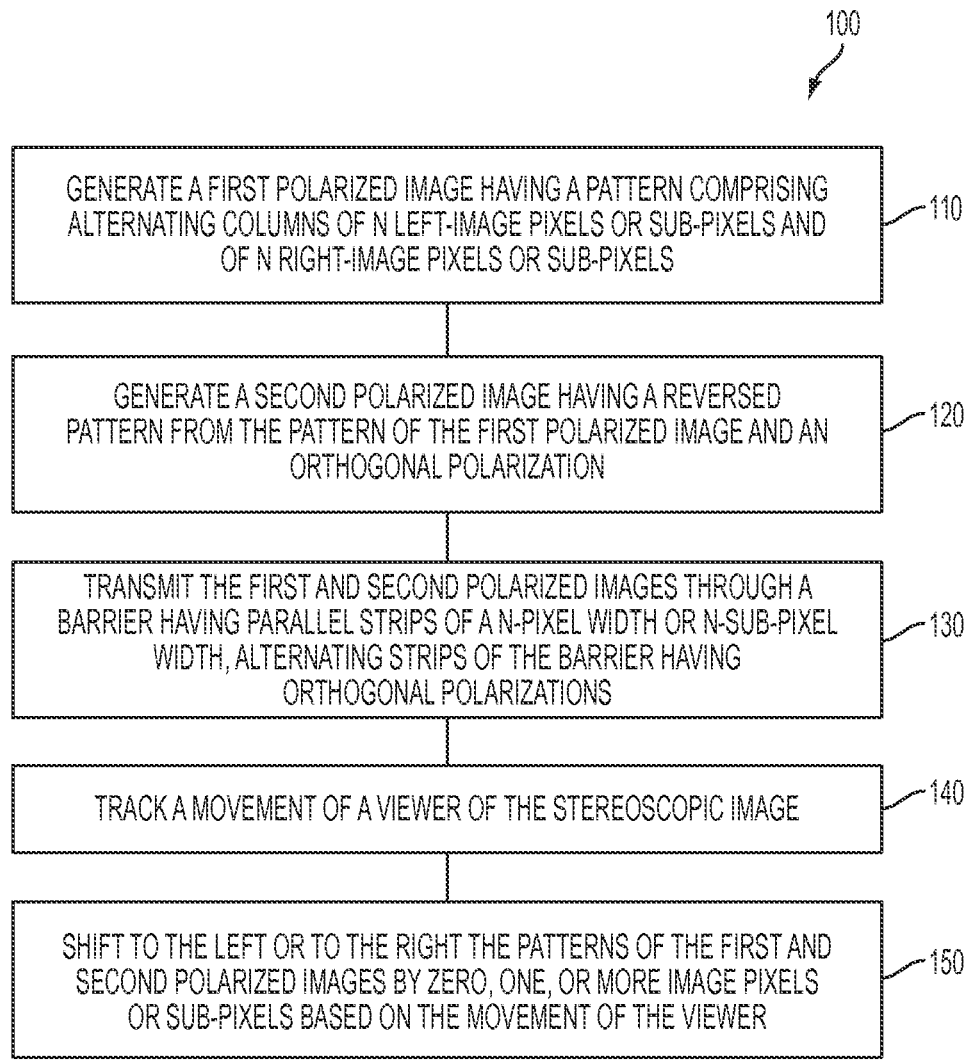
FIG. 1 is an example of a method for displaying a stereoscopic image according to an embodiment.

In the drawings, like numerals identify like features.

Various aspects of the present disclosure generally address one or more of the problems of providing high resolution three-dimensional (3D) imaging to viewers without requiring them to wear special glasses while also allowing freedom of movement to the viewers.

The following terminology is used throughout the present disclosure:

Stereoscopy: refers to a technique for creating or enhancing the illusion of depth in an image by presenting two offset images separately to the left and right eye of a viewer Autostereoscopy: manner of displaying stereoscopic images without requiring a viewer to wear special glasses or headgear;

Left-image, right-image: complementary images intended to be perceived by the left and right eyes of a viewer for forming a stereoscopic image;

Polarized image: image in which all image light waves are polarized at a given state;

Orthogonal polarization: opposite or complementary polarization;

Linear polarization: continuous polarization of light at a fixed angle;

Circular polarization: polarization of light at a continuously and regularly varying angle;

Pixel: a small, discrete element of an image, oftentimes split horizontally into three (3) sub-pixels in a Red-Green-Blue (RGB) arrangement;

Pattern: a predetermined image pixel distribution between two images of a stereoscopic display;

Columns: contiguous linear pixels of an image considered vertically and, by extension, columns of a display, of a pattern, and the like;

Parallel-strip barrier: a layer of material comprising parallel strips for alternatively passing or blocking light at a first polarization or during a first timeslot, and blocking or passing light at a second, orthogonal polarization, or during a second timeslot;

Position tracking: any one of various techniques for following a position of a viewer, including head tracking, eye tracking, and the like;

Shift: lateral displacement of a pattern by one or more pixels or sub-pixels;

Horizontal distance: horizontal component of a distance between two points;

Dimming: reduction of the luminance of a pixel or sub-pixel;

Display: a device generally for showing a video image; it is noted that the term "display" is also used in spelling out the acronym "LCD" for "liquid crystal display";

Screen: an image producing component of a display;

Full-resolution: term used to designate a high-quality video with no loss of resolution, having for example a 1,920 pixels wide by 1,080 pixels resolution;

3D screen: a screen capable of displaying two full resolution images distinguished with special 3D eyewear such as 3D polarized glasses or 3D shutter glasses;

Controller: a processor, a computer, a combination of processors and/or computers, possibly including a memory, an interface, and similar components, the controller may be hard-wired for carrying a function or may comprise programmable code for carrying a function;

Patterned retarder: component that modifies polarization of a light wave, according to a predefined pattern, for example in spatially alternating columns forming complementary strips;

Quarter wave retarder: a retarder used to convert between linear and circular polarization;

Active retarder: a light wave retarder that changes polarized light retardation over successive timeslots;

Polarizer filter: filter that passes through light, the light being linearly polarized in a specific direction;

Active shutter: a type of barrier, for example comprising a combination of an active retarder and of one or two polarizer filters, that passes or blocks light over successive timeslots.

Planned distance: preferred distance between a display and a viewer for optimum image viewing, according to a display system design; and Impinge: action of light arriving on a surface.

Embodiments of a method and display disclosed herein suggest generating, on the display, two complementary polarized images following patterns defined in columns over the display. The columns comprise a predetermined number (N) of pixels or sub-pixels. On a first image, a first column comprises, on each row, N left-image pixels or sub-pixels, which may be numbered 1 to N. A second column then comprises N right-image pixels or sub-pixels, which may be numbered N+1 to 2N. A third column then comprises N left-image pixels or sub-pixels, and is followed by a fourth column of N right-images pixels or sub-pixels. This alternating pattern continues over the full width of the display. On a second image, the above described pattern is reversed in that the first column comprises N right-image pixels or sub-pixels while the second column comprises N left-image pixels or sub-pixels. The reversed pattern continues for the second image over the full width of the display.

The first and second images may be generated on the same display, for example in complementary polarization, or in successive timeslots. The first and second images are viewed through a barrier having strips that may also have a N-pixel width or a N-sub-pixel width. On the barrier, alternating strips have alternating polarizations for either transmitting pixel columns of the first image, or of the second image, according to polarization of those images. A tracking system provides a position of a viewer to a controller. The controller may shift the patterns of the first and second images by zero (0), one (1) or more pixels or sub-pixels based on the position of the viewer. Consequently, as the viewer moves, for example to the left or to the right, although angles vary between the eyes of the viewer and the columns on the display as seen through the strips of the barrier, the patterns are shifted so that the left eye of the viewer continues seeing left image pixels or sub-pixels through appropriate strips of the barrier.

Referring now to the drawings, FIG. 1 is an example of a method for displaying a stereoscopic image according to an embodiment. A sequence 100 comprises a plurality of steps that may be executed in variable order, at least some of the steps possibly being executed concurrently. The sequence 100 comprises a step 110 of generating a first polarized image. The first polarized image has a pattern comprising alternating columns of N left-image pixels or sub-pixels and of N right-image pixels or sub-pixels. In step 120, a second polarized image is generated. The second polarized image has a pattern that is reversed from the pattern of the first polarized image, and a complementary, or orthogonal, polarization. The first and second polarized images are transmitted, at step 130, through a barrier having parallel strips of a N-pixel width or a N-sub-pixel width. Alternating strips of the barrier have orthogonal polarizations. A position of a viewer of the stereoscopic image is tracked at step 140. At step 150, the patterns of the first and second polarized images are shifted to the left or to the right as a function of the position of the viewer. Based on the position of the viewer, the patterns of the first and second polarized images may be shifted by zero, one, or more display pixels or sub-pixels. As will be shown hereinbelow, the present disclosure introduces alternative sequences for displaying a stereoscopic image.

Figure 2A:
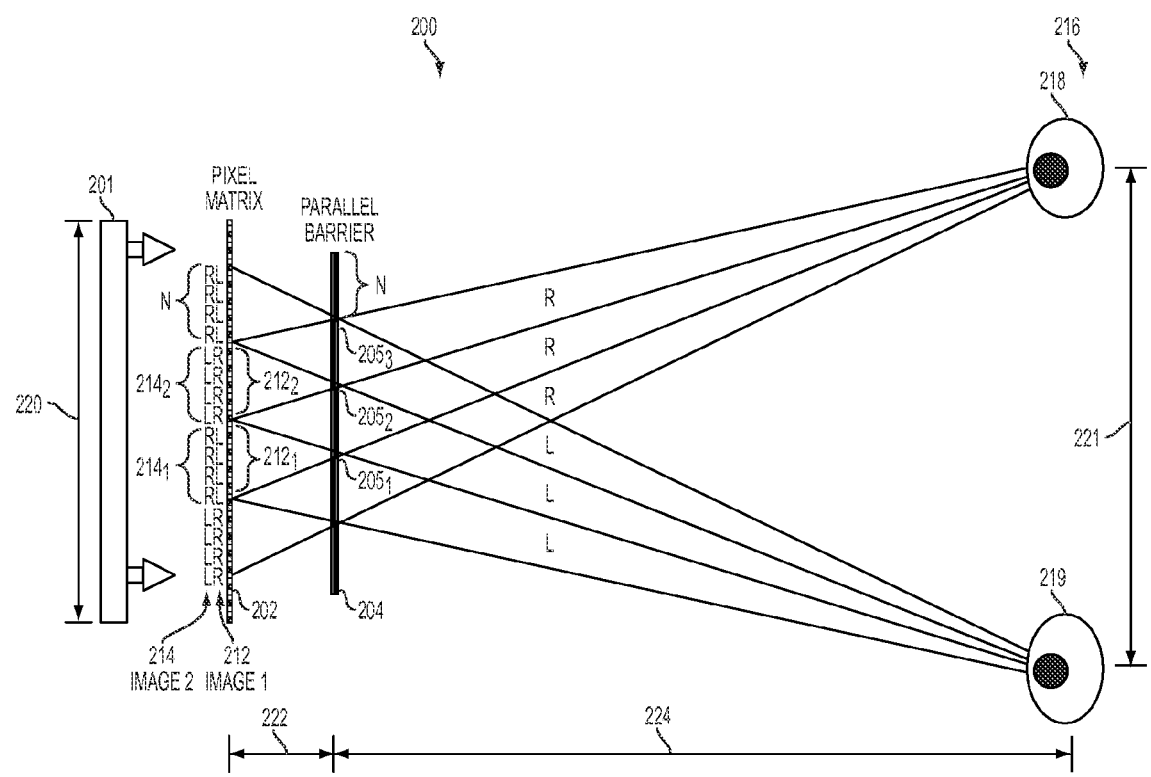
FIG. 2a is a schematic top plan view of a stereoscopic display system according to an embodiment.
Figure 3:
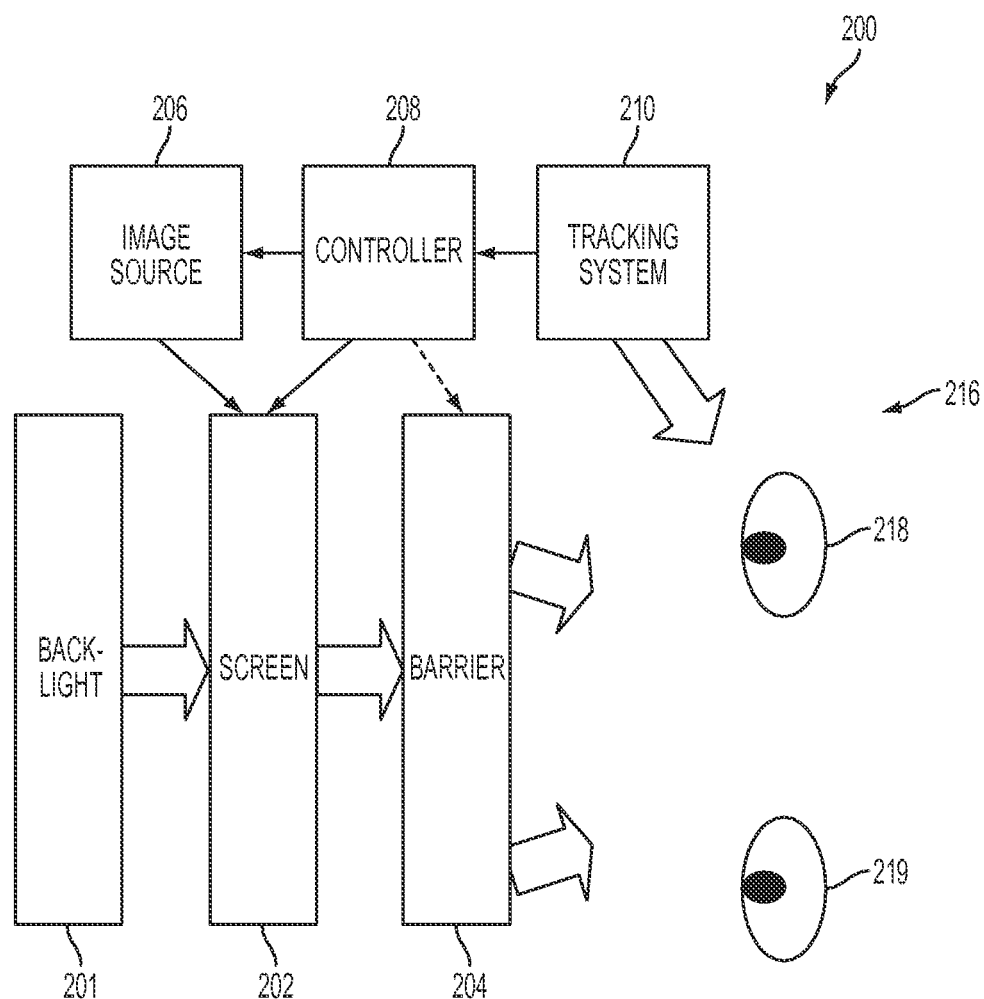

FIG. 2a is a schematic top plan view of a stereoscopic display system according to an embodiment. Although dimensions are shown, FIG. 2a is not to scale. FIG. 3 is a block diagram of the stereoscopic display system of FIG. 2a. Referring at once to FIGS. 2a and 3, a display system 200 is used for producing a stereoscopic image, for showing fixed 3D images or for showing moving 3D pictures. The display system 200 comprises a backlight 201, a screen 202, for example a pixel matrix such as a LCD panel having image polarization capabilities, a barrier 204 having parallel strips (the strips being detailed on later Figures), an image source 206, a controller 208 and a tracking system 210.

The backlight 201 illuminates the screen 202. The screen 202 may be a full resolution polarized display, which is usually intended for use by a viewer wearing passive polarized 3D glasses. Such display system may consist of two stacked LCD panel using a variable polarization angle to generate a stereo image, as described for example in U.S. Pat. No. 5,629,798 and No. 7,705,935, the disclosures of which being incorporated by reference herein in their entirety. In such embodiments, the barrier may be a complementary elliptical polarized filter.

Figure 2B:
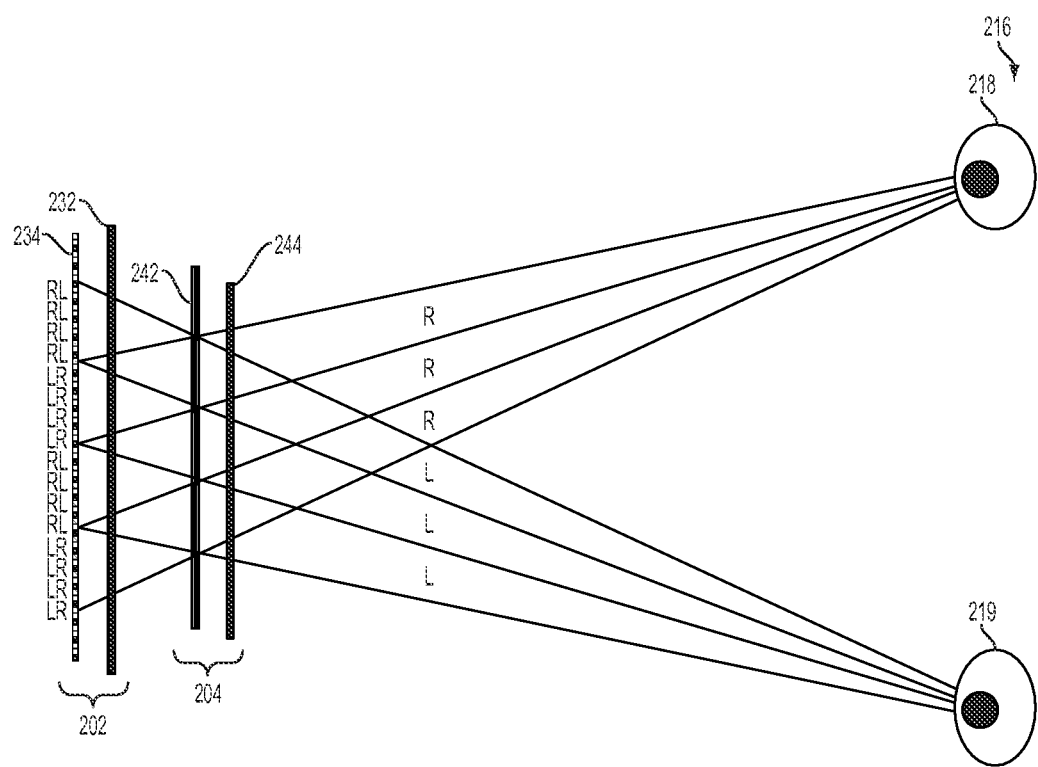
FIG. 2b is a schematic top plan view of a variant of the stereoscopic display system of FIG. 2a according to another embodiment.

Another variant of the screen 202 is shown on FIG. 2b, which is a schematic top plan view of a variant of the stereoscopic display system of FIG. 2a according to another embodiment. The screen 202 may comprise an active retarder 232 placed in front of an alternate frame sequencing screen 234, for example a LCD panel or an organic light emitting diode (OLED) panel. The active retarder 232 constantly changes polarization of light in rapid succession, in synchrony with display of the first and second images. The barrier 204 may form a layer comprising a patterned retarder film 242 followed by a polarizer filter 244. It may be observed that the polarizer filter 244 may be removed for allowing viewing by a plurality of users wearing 3D stereoscopic passive glasses.

Images produced by the screen 202 are patterned as follows: In a first image 212, a first group of N adjacent columns of pixels or sub-pixels contain right image information and a second group of N adjacent columns of pixels or sub-pixels contain left image information. This pattern of 2N columns is repeated over a width of the screen 202. In a second image 214, the above-described pattern is reversed; a first group of N adjacent columns of pixels or sub-pixels contain left image information and a second group of N adjacent columns of pixels or sub-pixels contain right image information. The images 212 and 214 have orthogonal polarizations. As shown on FIG. 2a, the value N is equal to 4 pixels. In other embodiments, N may take be in a range between 2 to 12 pixels. In yet other embodiments, N may represent a range between 6 to 24 sub-pixels, wherein each pixel is split into a red, a green and a blue sub-pixel, as is well-known to those skilled in the art. Other ranges of N may be used and the above values are not limiting the present disclosure. FIGS. 2a and 2b are simplified, for ease of illustration, by showing a small number of columns. In practice, a display system having a 1920-pixel horizontal resolution could for example have 480 columns, each having a column width N equal to 4 pixels.

Figure 4:
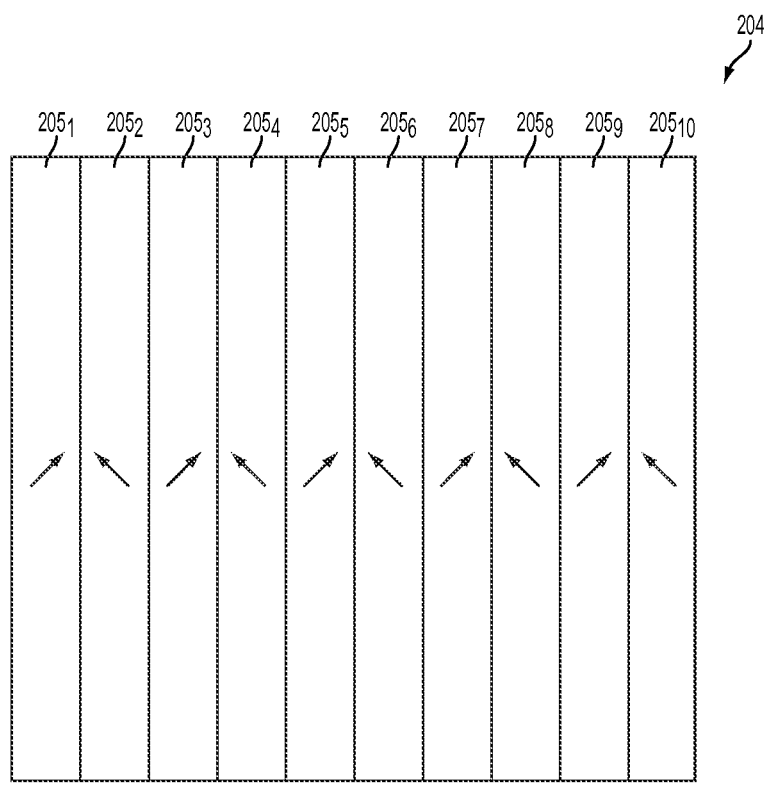
FIG. 4 is a simplified front view of a parallel-strip barrier.

FIG. 4 is a simplified front view of a parallel-strip barrier. The barrier 204 introduced hereinabove comprises a plurality of strips $205_i$ of alternating, orthogonal polarizations, strips $205_1$, $205_3$, $205_5$, $205_7$ and $205_9$ having a first polarization and strips $205_2$, $205_4$, $205_6$, $205_8$ and $205_{10}$ having a second polarization, which is complementary and orthogonal to the first polarization. A real-life realization of the barrier 204 may comprise a much larger number of strips $205_i$. Each strip is sized to match the pattern of the screen 202 and is thus N-pixel or N-sub-pixel wide. The barrier 204 as a whole is sized to match a size of the screen 202. The barrier 204 may be constructed as a patterned quarter wave retarder film or may alternatively comprise strips $205_i$ alternating between a first polarization angle θ and a second polarization angle θ plus 90 degrees, for example 45 degrees and 135 degrees of polarization.

Figure 5A:
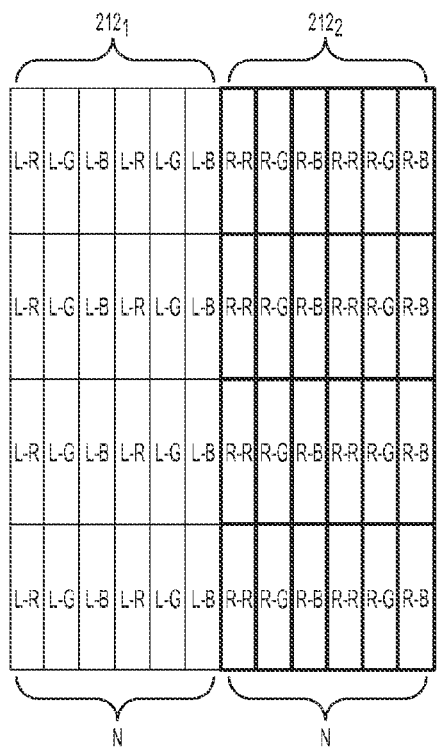
FIG. 5a is a schematic, partial view of a first image, polarized at 45 degrees, produced on a 3D screen.
Figure 5B:
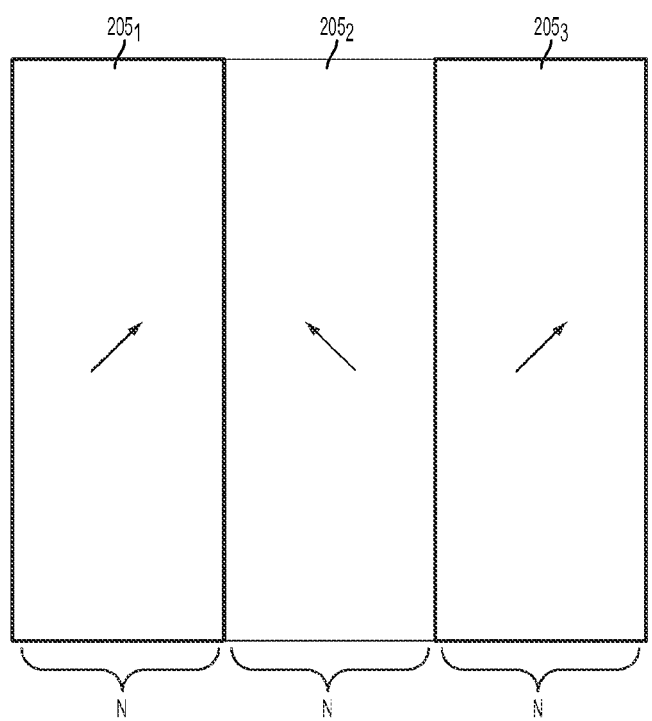
FIG. 5b is a schematic, partial view of a parallel-strip barrier comprising alternating linear polarized strips oriented at 45 degrees and 135 degrees.

FIG. 5a is a schematic, partial view of a first image, polarized at 45 degrees, produced on a 3D screen. FIG. 5b is a schematic, partial view of a parallel-strip barrier comprising alternating linear polarized strips oriented at 45 degrees and 135 degrees. Considering at once FIGS. 5a and 5b, a partial view of the first image 212 forms a 12 sub-pixels wide by 4 pixels high matrix. In a practical realization, the 3D screen may comprise a much larger number of pixel rows and columns while the barrier would be sized accordingly. As shown in FIGS. 5a and 5b, the value N is set to 6 sub-pixels, this value being selected solely for purposes of illustration.

FIG. 5a illustrates the first image 212 produced by the screen 202 at a first polarization. Sub-pixels are identified by two letters, for example "R-G" or "L-B", in which the first letter represents a right (R) or left (L) image pixel while the second letter represents one of the colors red (R), green (G) or blue (B). The rightmost N sub-pixel columns, identified with bold lines, form a group $212_2$ of right-image pixels. These pixels are emitted by the screen 202 and pass through a strip $205_3$ of the barrier 204, shown on FIG. 5b. Highlighting of the strips $205_1$ and $205_3$ with bold lines reflects the fact that their polarization matches that of the first image 212. The strips and pixel groups of FIGS. 5a and 5b are also illustrated on FIG. 2a, in which the top view allows to observe the geometry of the various elements and the directionality between the pixel columns of the screen 202, the strips of the barrier 204, and the eyes 218 and 219 of the viewer 216. One may observe on FIG. 2a that the group $212_2$ of right-image pixels project through the strip $205_3$ towards the right eye 218 of the viewer.

Polarization of the strip $205_3$ thus provides that those N sub-pixel columns $212_2$ directionally propagate toward the right eye 218 of the viewer 216, if positioned appropriately. Another group $212_1$ of N sub-pixel columns, identified with thin lines on FIG. 5a, represents left-image pixels. These pixels are emitted by the screen 204 and impinge on a strip $205_2$ of the barrier 204. Owing to the orthogonal polarization of the strip $205_2$, these left pixels are blocked from view from the right eye 218 of the viewer 216. However, the same left pixels of the group $212_1$ also impinge on a strip $205_1$ pass through the barrier 204 to directionally propagate toward the left eye 219 of the viewer 216.

FIG. 6a is a schematic, partial view of a second image, polarized at 135 degrees, produced on a 3D screen. FIG. 6b is another schematic, partial view of the parallel-strip barrier of FIG. 5b. FIG. 6a shows a part of the second image 214. It may be observed on FIG. 2a that pixel groups $214_1$ and $214_2$ of FIG. 6a are emitted from a same portion of the screen 204 that also emits pixel groups $212_1$ and $212_2$. FIG. 6b is identical to FIG. 5b except for the highlighting of a different strip matching a current polarization of the screen 204 at the time of producing the image 214.

FIG. 6a thus illustrates the second image 214 produced by the screen 202 at a second polarization. The leftmost N sub-pixel columns, identified with bold lines, form a group $214_1$ of right-image pixels. These pixels are emitted by the screen 202 and pass through a strip $205_2$ of the barrier 204, identified with bold lines on FIG. 6b to reflect that its polarization matches that of the second image 214. Polarization of the strip $205_2$ provides that those N sub-pixel columns $214_1$ will be visible from the right eye 218 of the viewer 216, if positioned appropriately. A rightmost group $214_2$ of N sub-pixel columns, identified with thin lines on FIG. 6b, represents left-image pixels. These pixels are emitted by the screen 204 and impinge on a strip $205_3$ of the barrier 204. Owing to the polarization of the strip $205_3$, which is orthogonal from the polarization of the second image 214, these left pixels are blocked from view by the right eye 219 of the viewer 216. However, the same left pixels also impinge on the strip $205_2$ and pass through the barrier 204 to be visible by the left eye 219 of the viewer 216.

It may be observed that, in the above description of FIGS. 6a and 6b, both a left and a right group of image pixels pass through the same strip $205_2$ and is visible by respective left and right eyes of the viewer 216. This occurs in the specific example as shown because the strip $205_2$ is located in mid-length of the barrier 204. This particular case may not apply in other display system configurations and geometries.

It may also be observed that the screen 202, the barrier 204 and the general geometry of the display system 200 relative to the position of the viewer 216, as shown on FIG. 2a, allows viewing a 3D image without the need for the viewer 216 to wear any glasses or headgear. Full resolution of the 3D image is obtained by a combination of the first image 212 with the second image 214 of the 3D screen 202.

Without limiting the scope of the present disclosure, FIG. 2a shows the display system 200 in which N is equal to 4 image pixels or 12 image sub-pixels, the screen 202 has a 1920-pixel horizontal resolution over a width 220 of about 60 cm, the barrier 204 is positioned at a distance 222 of about 1 cm from the screen 204 while a planned distance 224 between the display system 200 and the viewer 216 is about 60 cm. The viewer 216 is substantially positioned at the planned distance 224 and substantially centered with the stereoscopic image, as illustrated on FIG. 2a. In embodiments operating to shift the patterns of the first and second polarized images on a per pixel basis, rather than on a per sub-pixel basis, strips of the barrier 204 may be wider and a distance between the barrier 204 and the screen 202 may be larger. Those of ordinary skill in the art, having the benefit of the present disclosure, will be able to readily construct display systems of various sizes and shapes, for various uses, adapting the value N according to their display geometries.

Returning to FIG. 3, the tracking system 210 comprises a camera (not explicitly shown) for following a position of the viewer 216. The camera may for example be a webcam positioned immediately above the screen 202. In an embodiment, the tracking system 210 may follow the head of the viewer 216. In another embodiment, the tracking system 210 may separately follow the right eye 218 and the left eye 219 of the viewer 216. The tracking system 210 may also calculate a distance 221 between the right eye 218 and the left eye 219 of the viewer 216. User position tracking systems are well-known in the art and are not described further herein.

The tracking system 210 provides viewer position information to the controller 208, including a horizontal position and possibly including a vertical position of the viewer. In turn, based on the viewer position data, the controller 208 may instruct the screen to shift to the left or to the right the patterns of the first and second images 212 and 214. Alternatively, the controller 208 may instruct the image source 206 to shift to the left or to the right sources for the patterns of the first and second images 212 and 214. Because the image pixels and the strips $205_i$ of the barrier 204 are defined in columns, which are generally vertical, an up or down movement of the viewer 216 has limited impact on image perception. The following Figures and their description will reveal how shifting of the patterns allows providing the viewer 216 with a high quality stereoscopic image display while allowing freedom of movement.

Figures 7A, 7B:
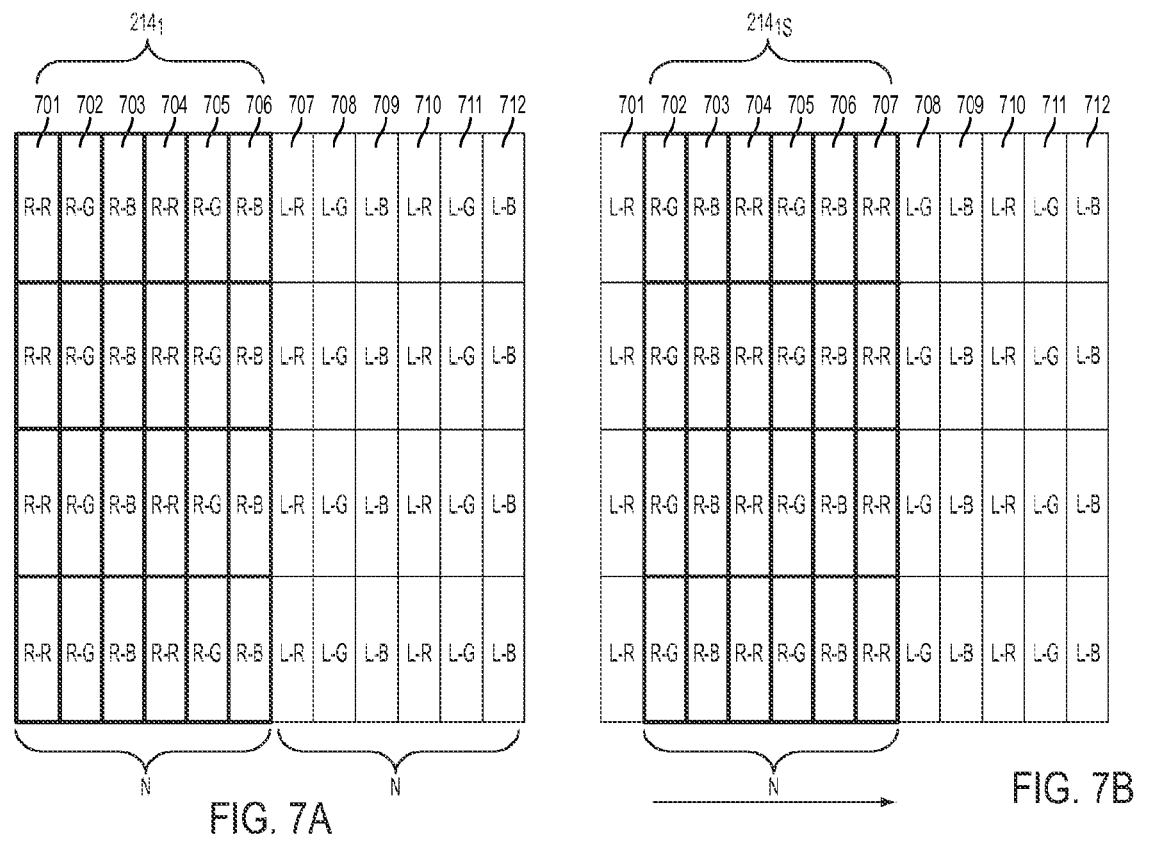

FIG. 7a is another schematic, partial view of an image produced on a 3D screen. The value N is set to 6 sub-pixels in the non-limiting example of FIG. 7a. The Figure shows a partial image comprising 4 pixel rows and 12 sub-pixel columns. FIG. 7a provides similar information to that of FIG. 6a, so the leftmost N sub-pixel columns, identified with bold lines, form a group $214_1$ of right-image pixels. Additionally, for illustration purposes, the sub-pixel columns of FIG. 7a are numbered 701-712, in which these indicia represent actual physical sub-pixel locations on the screen 202. It may be seen that the group $214_1$ of right-image pixels physically appears on sub-pixel columns 701-706 of the screen 202.

FIG. 7b shows the effect of a pattern shift by one sub-pixel in the image of FIG. 7a. The tracking system 210 detects a moderate change of the position of the viewer 216 towards the right. More specifically, the tracking system 210 may detect a movement of the viewer's head towards the left, or a movement of the viewer's eyes towards the left. Information about a new position of the viewer is provided by the tracking system 210 to the controller 208. Based on the position information, the controller 208 calculates an amount of shift of the patterns applied to the images 212 and 214 toward the right and instructs the screen 202 to shift the patterns accordingly. In the example of FIG. 7b, the pattern applied to the image 214 is shifted toward the right by one sub-pixel. A different group $214_{1s}$ of right-image pixels, in which the pattern is shifted by one sub-pixel, now physically appears on sub-pixel columns 702-707 of the screen 202. Should the viewer 216 move back to the original position, the tracking system 210 detects the new viewer position and informs the controller 208 that in turn instructs the screen 202 to revert to the original images 212 and 214, with a zero-shift, as illustrated on FIG. 7a. Of course, the patterns applied to the images 212 and 214 may be shifted towards the left or towards the right based on a detected position of the viewer 216. The patterns may be shifted by up to N pixels or sub-pixels, in either direction.

Though FIG. 7b illustrates shifting of the patterns on a sub-pixel basis, some displays may operate to shift the patterns on a per pixel basis. This may for example apply in a case where the display is integrated in a tablet that the viewer may turn from a landscape to a portrait orientation. While the tablet is held in landscape orientation, shifting may be made horizontally on a per sub-pixel basis, as shown on FIGS. 7a and 7b. When the tablet is held in portrait orientation, sub-pixels become vertically oriented column-wise and shifting is made horizontally between pixels. In other variants, shifting on a per pixel basis may also be used when a construction of a display is not using a RGB sub-pixel arrangement.

It may be observed that while the position of the patterns applied to the left-image and right-image sub-pixels are shifted as the viewer's head changes position, a given sub-pixel continues being displayed on the screen at constant sub-pixel location, either using the first image 212 or the second image 214, depending on a phase of the pattern at that sub-pixel location. For example, red sub-pixels displayed as right sub-pixels (R-R) in sub-pixel column 701 of FIG. 7a remain as red sub-pixels in sub-pixel column 701 of FIG. 7b, but are now displayed as left sub-pixels (L-R). It is therefore the position of the polarization patterns that is shifted when the viewer's head moves, and not the actual image pixel or sub-pixel.

Figures 8A, 8B:
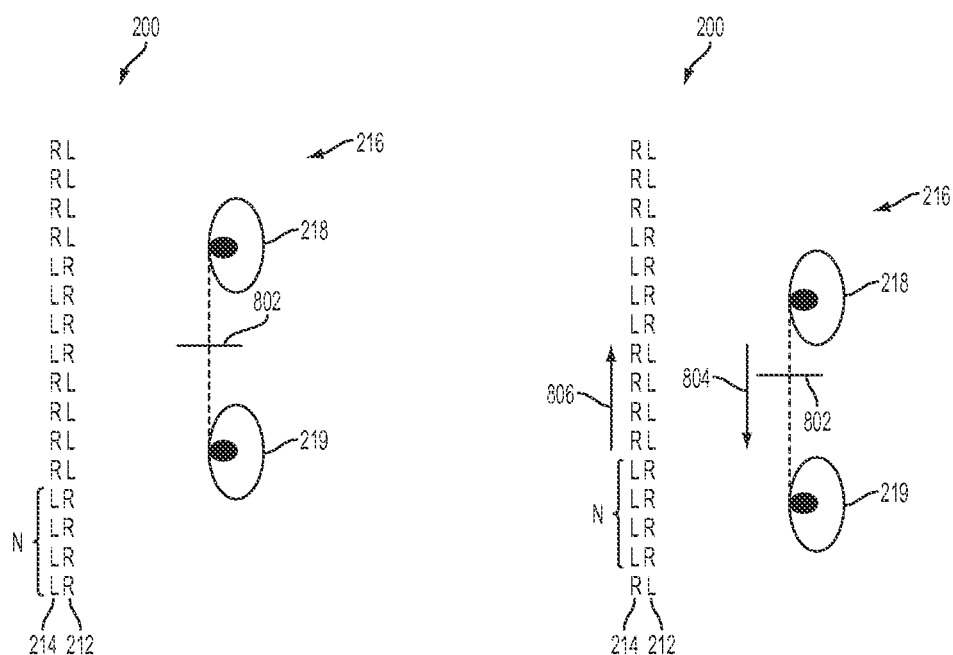
FIGS. 8a and 8b illustrate an example of movement to the left of a viewer's eyes and a corresponding shift in a pattern of pixels.

FIGS. 8a and 8b illustrate an example of movement to the left of a viewer's eyes and a corresponding shift in a pattern of pixels. The display system 200 is much simplified to show pixel columns of the images 212 and 214. In the example of FIGS. 8a and 8b, a value N is set to 4 pixels. On FIG. 8a, the viewer 216 is positioned along a center axis 802 of the display system 200. On FIG. 8b, the viewer 216 moves to the left, along arrow 804. A corresponding shift of the patterns of images 212 and 214 is made, along arrow 806, by one pixel to the right, as ordered by the controller 208 following a detection of the viewer's position by the tracking system 210. FIGS. 8a and 8b are not to scale and an amount of shift of the image patterns would depend in part on a distance between the screen 202 and the barrier 204, on a distance between the barrier 204 and the viewer 216, and on a distance between the eyes of the viewer 216.

While a value "N" is selected to determine a width of the pattern of pixels, according to a geometry of the display system 200 and to an expected distance of the viewer 216 from the screen 202, this value may vary over the width of the screen 202. The pattern width may get larger as a viewing angle increases between the viewer 216 and leftmost or rightmost edges of the screen 202, due to relative increased distance between the screen 202 and the barrier 204 over large viewing angles. As an example, the pattern may have a N sub-pixel width in the center of the screen 202, but increase to a N+1 sub-pixel width toward the left or right edge of the screen 202.

For 2D viewing, or if at any given time the position of the viewer 216 cannot be tracked by the tracking system 210, the controller 208 may instruct the screen 202 to generate identical first and second images 212 and 214. The controller 208 may also instruct the screen 202 to generate identical first and second images 212 and 214 when the tracking system 210 detects an important tilt of the viewer's head, for instance when the viewer is lying horizontally in front of the display system 200. This helps in reducing eventual viewing discomfort and loss of 3D effect because of a disparity between an axis of stereo image separation and an axis of the viewer's eyes. Any image pixel of the first image 212, when hidden from view by the barrier 204, corresponds to an identical image pixel of the second image 212, which is channeled towards the viewer 216 by the barrier 204, and vice-versa. A resulting full resolution 2D image then becomes visible from a wide range of angular positions of the viewer 216, over a wide range of viewer distances.

The strips of the barrier 204 may be parallel or substantially parallel to the columns of the first and second polarized image patterns. There may be cases where a shift by an integer number of pixels or sub-pixels does not exactly match a given position of the viewer 216. Depending on an amount of shift of the image patterns, from the viewer's standpoint, it may be possible for a complete pixel column or sub-pixel column emitted from the screen 202 to appear at a junction of two adjacent strips 205 of the barrier 204. This may lead to crosstalk between the left image and the right image over a complete vertical pixel line. The same situation may occur if the viewer 216 is located closer to or further away from the display system 200 compared to the planned distance 224 between the display system 200 and the viewer 216, or depending on a distance between the eyes of the viewer 216. To alleviate this possibility, in an embodiment, the strips 205 of the barrier 204 may be slightly rotated from a vertical axis. For example, the strips 205 may be axially rotated by an angle varying between 2 to 30 degrees, for example 9 degrees.

A large angle of rotation of the barrier 204 relative to the columns of the first and second polarized image patterns, for example 30 degrees, may be used for example in tablet applications, wherein the large angle of rotation allows shifting patterns row-wise or column-wise, depending on a portrait or landscape orientation of the tablet. Whether the tablet is held in landscape or portrait orientation, shifting to the left or to the right the image patterns will provide similar effect of catering for the position of the viewer.

Figure 9:
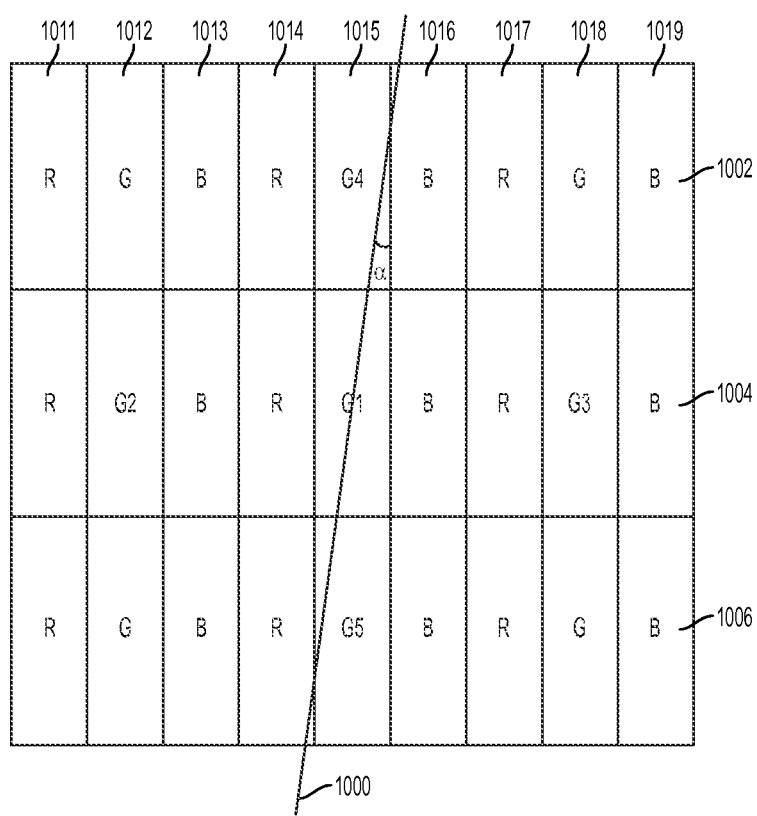
FIG. 9 is a schematic representation of a partial image in which one sub-pixel intended for view through one eye interferes with a sub-pixel of a corresponding image intended for view through the other eye.

FIG. 9 is a schematic representation of a partial image in which one sub-pixel intended for view through one eye interferes with a sub-pixel of a corresponding image intended for view through the other eye. An oblique line 1000 represents a junction between two adjacent strips of the barrier 204 over the screen 202. Considering that columns of image pixels on the screen 202 are vertical, the line 1000 shows that the strips 205 are rotated by an angle $\alpha$, which is exaggerated on FIG. 9 for ease of illustration. Arbitrary pixel rows 1002, 1004 and 1006 and arbitrary sub-pixel columns 1011-1019 as shown may be located on various parts of the screen 202. The pixel patterns may be oblique and follow the angle of the barrier strips 205. The tracking system 210 provides viewer position information to the controller 208, which may include a vertical position. Based on the viewer vertical position data, the controller 208 may instruct the screen 202 to shift to the left or to the right the oblique patterns of the first and second images 212 and 214.

The controller 208 comprises a memory map of the structure of the screen 202 and of the barrier 204. The controller also knows a value of the axial rotation of the strips 205 of the barrier 204 relative to the pixel columns of the screen 202. The controller 208 further has information about any shift of the patterns of the images 212 and 214 on the screen 202. The controller 208 may also consider a vertical position of the viewer, obtained from the tracking system 210. The controller thus calculates points of the patterns where left and right image sub-pixels overlap as seen from the viewer based on the vertical and horizontal position of the viewer and on the axial rotation of the barrier 204. As shown on FIG. 9, a green sub-pixel G1 located at the junction of pixel row 1004 and of sub-pixel column 1015 is located at such a point. Consequently, cross-talk may occur between a left green sub-pixel and a right green sub-pixel at point G1.

In an embodiment, the controller 208 may instruct the screen 202 to turn off either or both of the left and right image sub-pixels at point G1. In another embodiment, the controller 202 may instruct the screen 202 to dim a brighter one of the left and right image sub-pixels at point G1. This dimming may be compensated by an increase of one or more proximally located green sub-pixels. As is well-known in the art, sub-pixel luminance for a given color may be specified as an integer number in a 0-255 range. Assuming the left green sub-pixel at point G1 has a luminance value of 150 while the corresponding right green sub-pixel has a luminance value of 100, the left green sub-pixel of point G1 may be dimmed down to a luminance value of 100, reducing the cross-talk effect at that point. To compensate, a luminance value of one or more surrounding left image green sub-pixels may be increased. For example, the luminance of left green sub-pixels G2 and G3 may each be increased by 25 points, or the luminance of the left green sub-pixels G2, G3, G4 and G5 may each be increased by 12 points. In a variant that operates to shift image patterns on a per pixel basis, luminance compensation may also operate on a per pixel basis. In another variant, defining a value N that is not a multiple of three (3) sub-pixels, for example defining N equal to 13 sub-pixels, allows distributing a number of dimmed sub-pixels over all three (3) colors.

Returning again to FIG. 2a, when the tracking system 210 determines that the viewer 216 is closer to the display system 200 as compared to the planned distance 224 between the display system 200 and the viewer 216, the controller 208 may adjust the value N by decreasing the width of the pixel pattern or sub-pixel pattern, for example from 12 down to 11 or 10 sub-pixels or from 4 down to 3 pixels. If the value N of the barrier cannot be changed, as in the case of a fixed barrier, crosstalk between left and right pixels may occur at a plurality of points similar to G1 and the above described pixel or sub-pixel dimming and luminance compensation for dimmed pixels or sub-pixels may be applied where necessary. If the viewer 216 moves further away from the display system 200 as compared to the planned distance 224, any loss of resolution has a reduced effect because of the sheer distance between the viewer 216 and the display system 200. Additional embodiments for overcoming issues related to a distance between the viewer 216 and the display system 200 are described hereinbelow.

Figure 10:
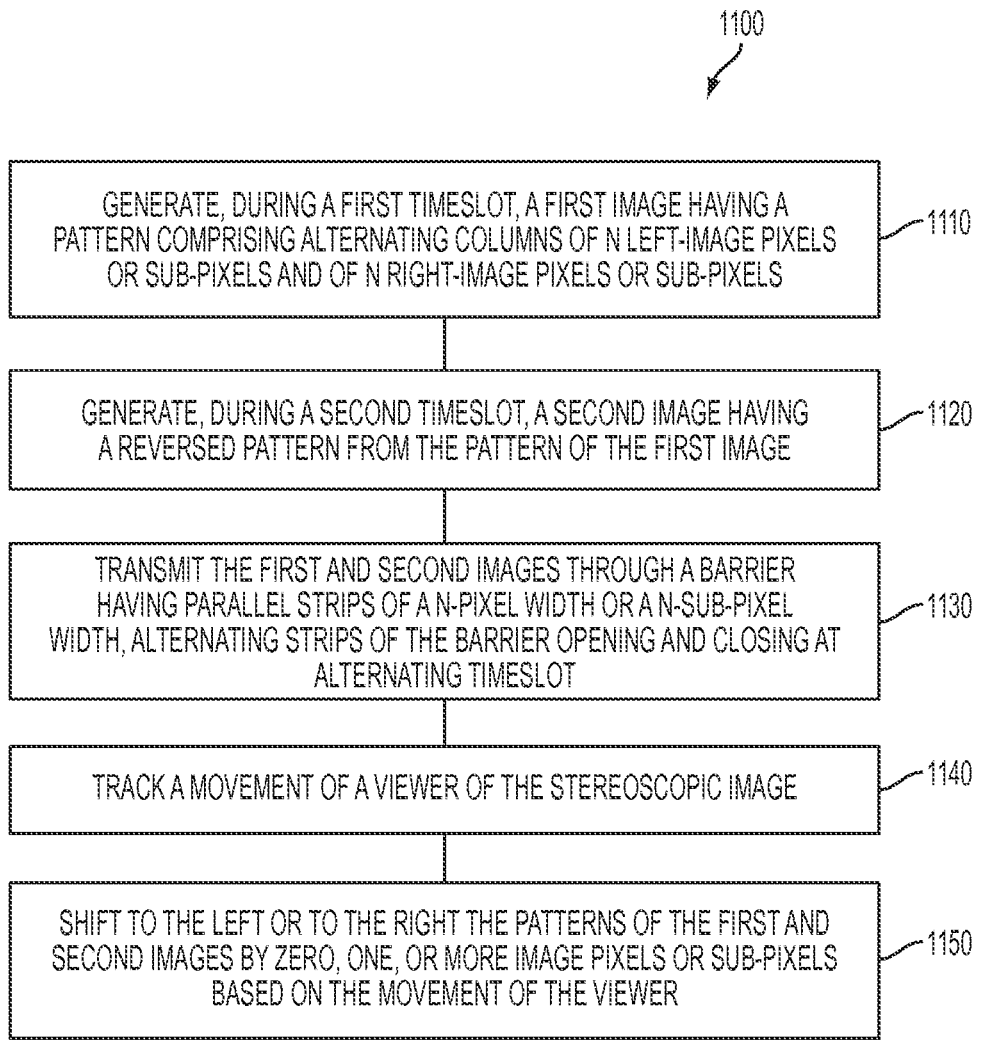
FIG. 10 is another example of a method for displaying a stereoscopic image according to an alternate embodiment.

In some embodiments, images having vertical pixel rows split into groups of N left and right pixels or sub-pixels, similar to images 212 and 214, may be produced one after the other, in a sequence of successive timeslots. In those embodiments, a barrier is given a time sequence by alternating parallel vertical strips between opaque and transparent forms, for example forming a block-pass-block-pass pattern while a first image is being displayed, and forming and pass-block-pass-block pattern while a second image is being displayed. FIG. 10 is another example of a method for displaying a stereoscopic image according to an alternate embodiment. A sequence 1100 comprises a plurality of steps that may be executed in variable order, at least some of the steps possibly being executed concurrently. The sequence 1100 comprises a step 1110 of generating a first image during a first of two timeslots. The first image has a pattern comprising alternating columns of N left-image pixels or sub-pixels and of N right-image pixels or sub-pixels. In step 1120, a second image is generated during a second of the two timeslots. The second image has a pattern that is reversed from the pattern of the first image. The first and second images are transmitted, at step 1130, through a barrier having parallel strips of a N-pixel width or a N-sub-pixel width. Even numbered strips of the barrier open at each successive first timeslots and close at each successive second timeslots while odd numbered strips close at each of the first timeslots and open at each of the second timeslots. A position of a viewer of the stereoscopic image is tracked at step 1140. At step 1150, the patterns of the first and second images are shifted to the left or to the right as a function of the position of the viewer. Based on the position of the viewer, the patterns of the first and second images may be shifted by zero, one, or more display pixels or sub-pixels. As will be shown hereinbelow, the sequence of FIG. 10 can be generalized further.

Figure 11:
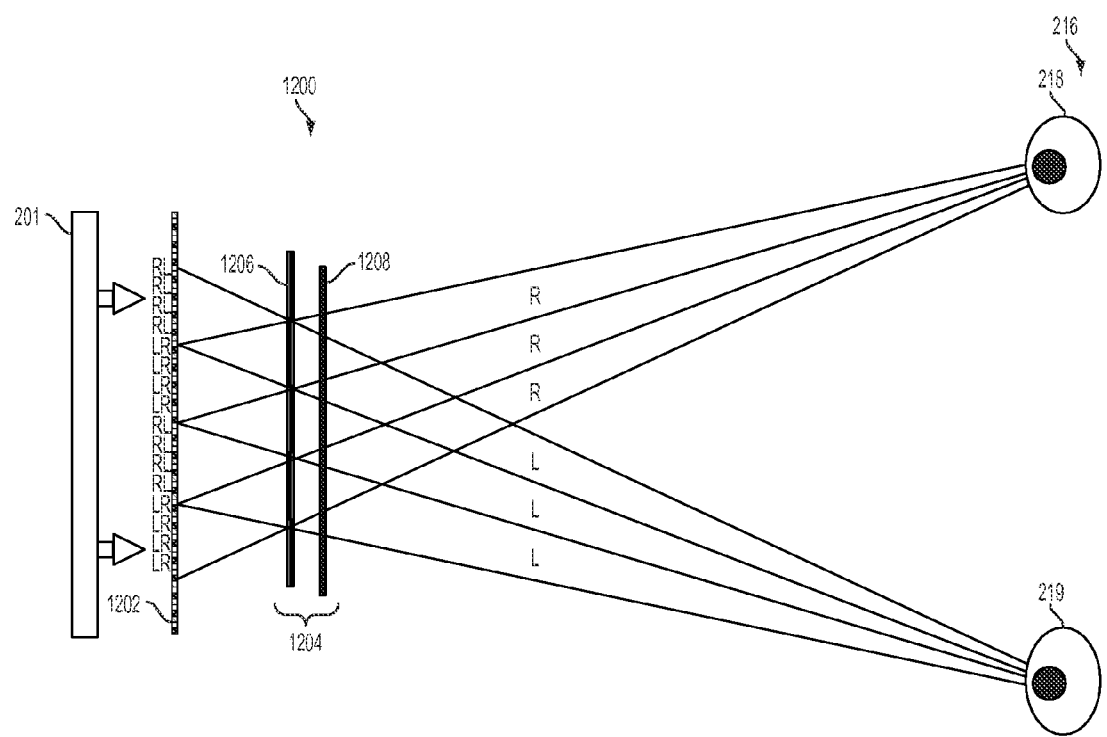
FIG. 11 is a schematic top plan view of another stereoscopic display system according to another embodiment.
Figure 12:
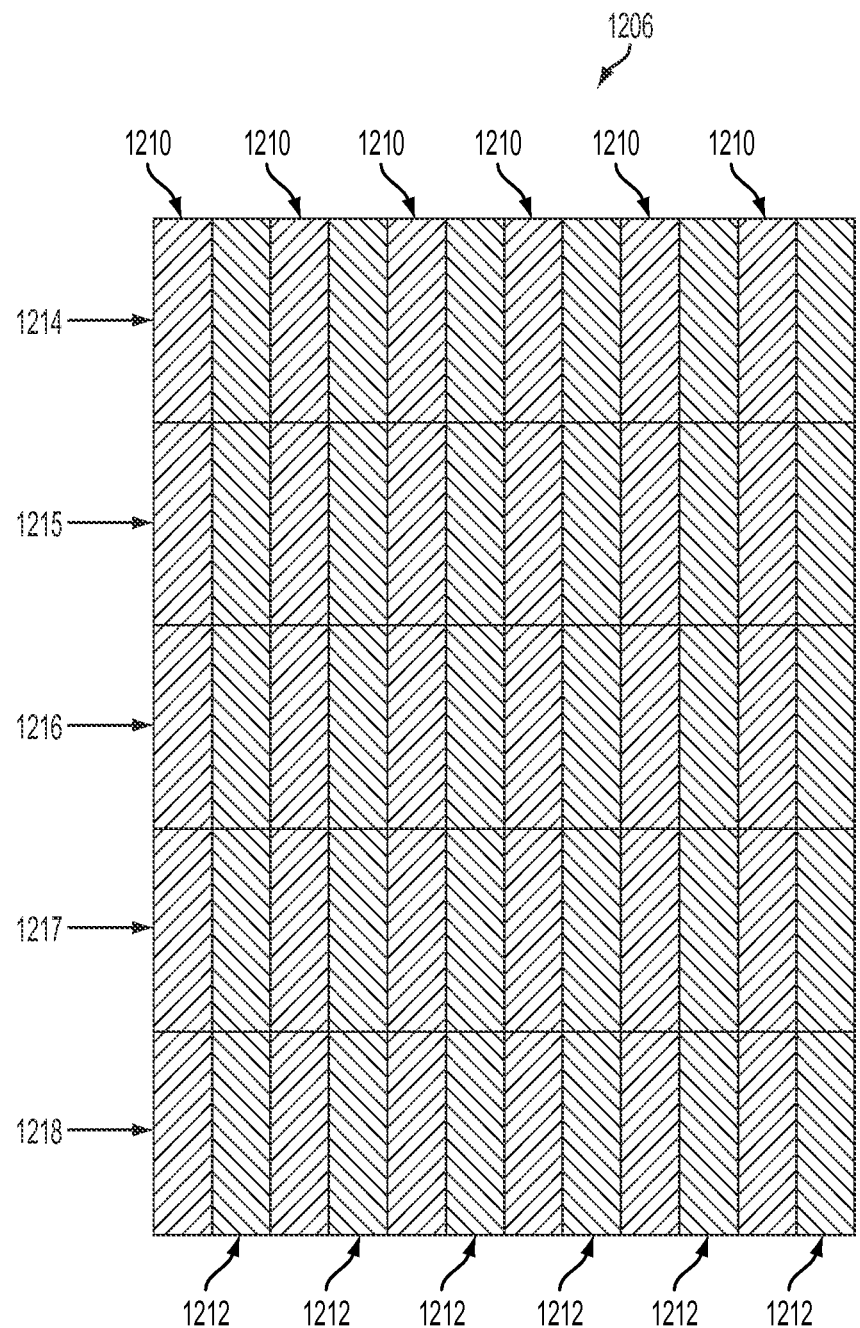
FIG. 12 is a simplified front view of a patterned active retarder.

FIG. 11 is a schematic top plan view of another stereoscopic display system according to another embodiment. In a display system 1200, the screen 202 of FIGS. 2a and 3 is replaced by a time multiplex 3D display 1202, such as conventional 3D displays usually intended for use by a viewer wearing active shutter 3D glasses. As in the case of the screen 202, the display 1202 produces first and second images having a pattern and a reversed pattern in which pixels or sub-pixels are arranged into columns of N pixels or sub-pixels, alternating left-image and right-image columns. Like FIGS. 2a and 2b, FIG. 11 is simplified, for ease of illustration, by showing a small number of columns. The first and second images are produced by the display 1202 over successive timeslots. A barrier 1204 comprises an active retarder 1206 and a polarizer filter 1208. The barrier 1204 may also be called a patterned active shutter. FIG. 12 is a simplified front view of a patterned active retarder. Vertical strips 1210 and 1212 also have a N-pixel or N-sub-pixel width. The vertical strips 1210 open at each of a first timeslot and close at each of second timeslot while the vertical strips 1212 close at each of the first timeslot and open at each of the second timeslot. Retardation of the strips 1210 and 1212 of the active retarder 1206 therefore alternate over odd and even timeslots. Subsequently, the polarizer filter 1208 passes or blocks image columns in order to properly direct light towards the left eye 219 or right eye 218 of the viewer 216. A controller such as the controller 208 introduced hereinabove may ensure synchronization between polarization changes on image rows of the display 1202 and retardation changes of the strips 1210 and 1212. In an embodiment, the strips 1210 and 1212 are split into rows, for example into five (5) rows 1214-1218. Different numbers of rows may also be used. As the first rows at the top of an image of the display 1202 are refreshed, the strips 1210 and 1212 alternate their retardation within the top row 1214. The strips 1210 and 1212 then alternate their retardation on the next row 1215 at a time when corresponding image rows of the display 1202 are refreshed. Updating the retardation of the strips 1210 and 1212 over a number of large rows, in synchrony with corresponding groups of image rows of the display 1202, reduces cross-talk. The vertical strip 1210 and 1212 of the patterned active barrier may be parallel or substantially parallel to the columns of the first and second images. The vertical strip 1210 and 1212 of the patterned active barrier may alternatively be tilted by 2 to 30 degrees, for example 9 degrees, for the same raisons explained hereinabove. As in the case of the system of FIG. 2b, the polarizer filter 1208 may be removed for allowing viewing by a plurality of users wearing 3D stereoscopic passive glasses.

While the foregoing describes various embodiments of stereoscopic display systems and methods in which polarized images are generated on a screen and transmitted through a barrier having parallel polarizing strips, a variant of the present disclosure suggests positioning the screen in front of the barrier, so that the screen is closer to the viewer. Light from a backlight is first transmitted through the barrier and is then used by the screen to generate polarized images. A geometry of a resulting display system differs from those described hereinabove but the display nevertheless operates based on equivalent principles and provides similar results.

Figure 13:
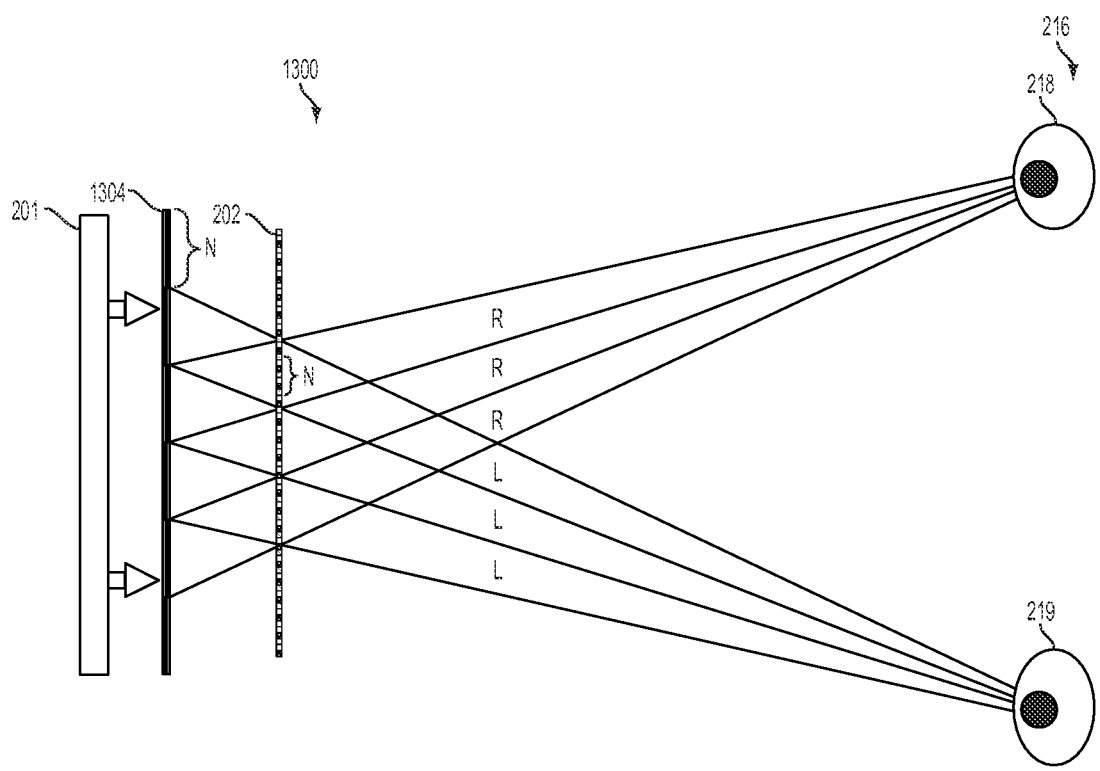
FIG. 13 is a schematic top plan view of a stereoscopic display system according to a further embodiment.
Figure 14:
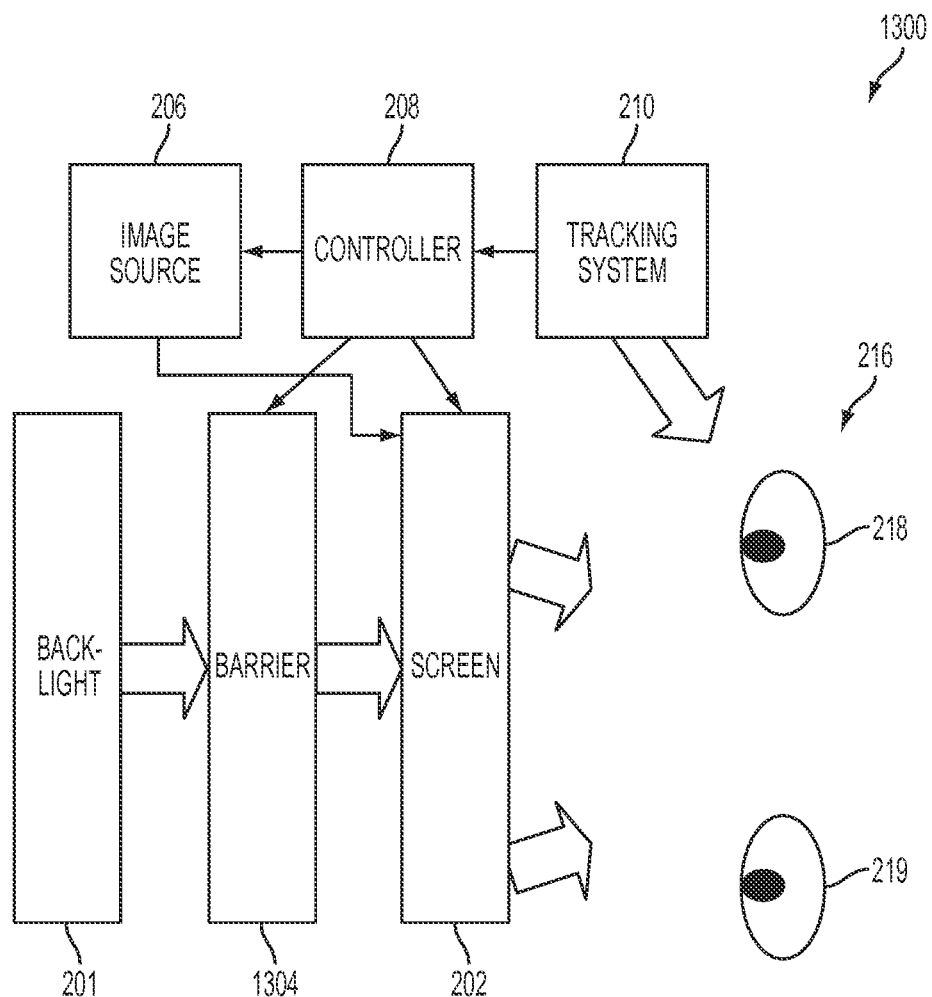
FIG. 14 is a block diagram of the stereoscopic display system of FIG. 13.

FIG. 13 is a schematic top plan view of a stereoscopic display system according to a further embodiment. FIG. 13 is not to scale and is simplified for ease of illustration. FIG. 14 is a block diagram of the stereoscopic display system of FIG. 13. A display system 1300 of FIGS. 13 and 14 may be compared with the display systems introduced hereinabove, as it generally operates in a similar fashion, using the same operating principles for showing stereoscopic images. The display system 1300 comprises a backlight 201, a barrier 1304, a screen 202 an image source 206, a controller 208 and a tracking system 210. The barrier 1304 may be similar to the barrier 1204 of FIG. 11, its elements being in a reverse order and comprising a polarizer filter and an active retarder similar to those of the barrier 1204, the barrier 1304 having parallel strips of a N-pixel or N-sub-pixel width, alternating strips of the barrier 1304 passing or blocking light, over successive timeslots. The screen 202 may, for example, be a light valve pixel matrix such as a LCD panel capable of displaying images in rapid succession. The screen may alternatively be full-resolution frame sequenced stereoscopic screen, similar to the screen 234 introduced hereinabove. The parallel strips of the barrier 1304 may be as shown on FIG. 12 and the screen 202 operates in a similar manner as the screens of earlier Figures. In operation of the display 1300, the backlight 201 illuminates the barrier 1304. The barrier 1304 transmits light from the backlight 201 towards the screen 202. The screen 202 in turn generates, from the transmitted light, a first image during a first of two timeslots, for example during 1/120 of a second, the first image having a pattern comprising alternating columns of N left-image pixels or sub-pixels and of N right-image pixels or sub-pixels, a second image being generated during a second of the two timeslots, the second image having a reversed pattern from the pattern of the first image. Columns of the first and second image patterns may be substantially parallel to the strips of the barrier 1304 or may be rotated by an angle varying between 2 to 30 degrees, for example 9 degrees. The tracking system 210 tracks a position of a viewer of the stereoscopic image. The controller 208 synchronizes operation of the screen 202 and of the active retarder function of the barrier 1304. The controller 208 also shifts to the left or to the right the patterns of the first and second images appearing on the screen 202 by a number of image pixels or sub-pixels determined as a function of the position of the viewer obtained from the tracking system 210. Shifting of image patterns provides the same effects as shown in earlier Figures.

Figure 15:
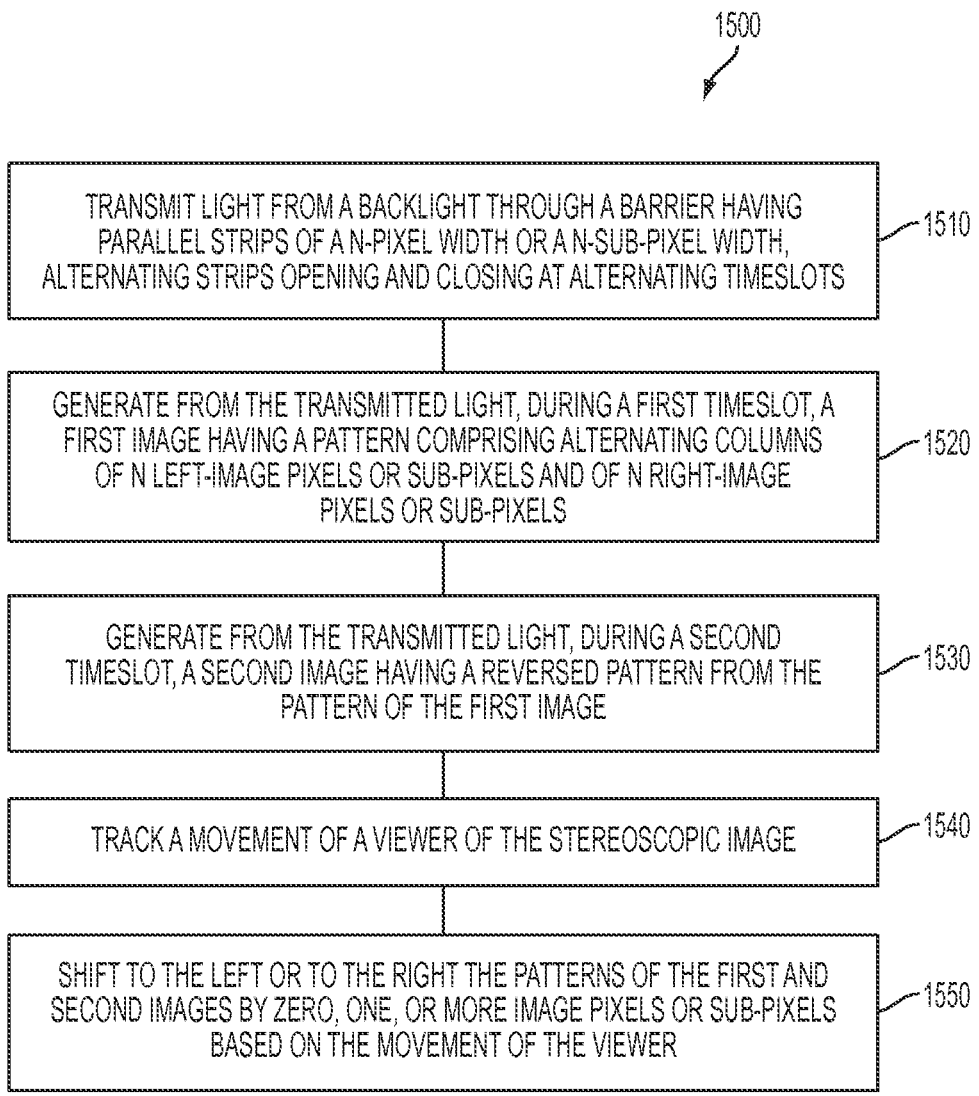
FIG. 15 is another example of a method for displaying a stereoscopic image according to yet another embodiment.

FIG. 15 is another example of a method for displaying a stereoscopic image according to yet another embodiment. A sequence 1500 comprises a step 1510 of transmitting light from a backlight through a barrier having parallel strips of a N-pixel width or a N-sub-pixel width, alternating strips of the barrier opening and closing at two alternating timeslots. Even numbered strips of the barrier open at each successive first timeslots and close at each successive second timeslots while odd numbered strips close at each of the first timeslots and open at each of the second timeslots. In step 1520, a first image is generated during the first timeslot, from the transmitted light, the first image having a pattern comprising alternating columns of N left-image pixels or sub-pixels and of N right-image pixels or sub-pixels. Then at step 1530, a second image is generated during the second timeslot, from the transmitted light, the second image having a reversed pattern from the pattern of the first image. A position of a viewer of the stereoscopic image is tracked at step 1540. At step 1550, the patterns of the first and second images are shifted to the left or to the right as a function of the position of the viewer. Based on the position of the viewer, the patterns of the first and second images may be shifted by zero, one, or more display pixels or sub-pixels.

It will therefore be apparent to those of ordinary skill in the art that the above described devices and methods for showing stereoscopic images may either generate patterned images and then transmit these images through a barrier having a corresponding opening and closing pattern, or transmit light through the barrier before using the light for image generation. In both cases, stereoscopic images are generated, and a tracking system may shift the image patterns on the screen in order to compensate for movements of a viewer. It may further be observed that when an active retarder is placed between the backlight and the screen, turning all its vertical strips to a transparent mode allow a plurality of viewers to perceive 3D images when wearing active glasses.

Figure 16:
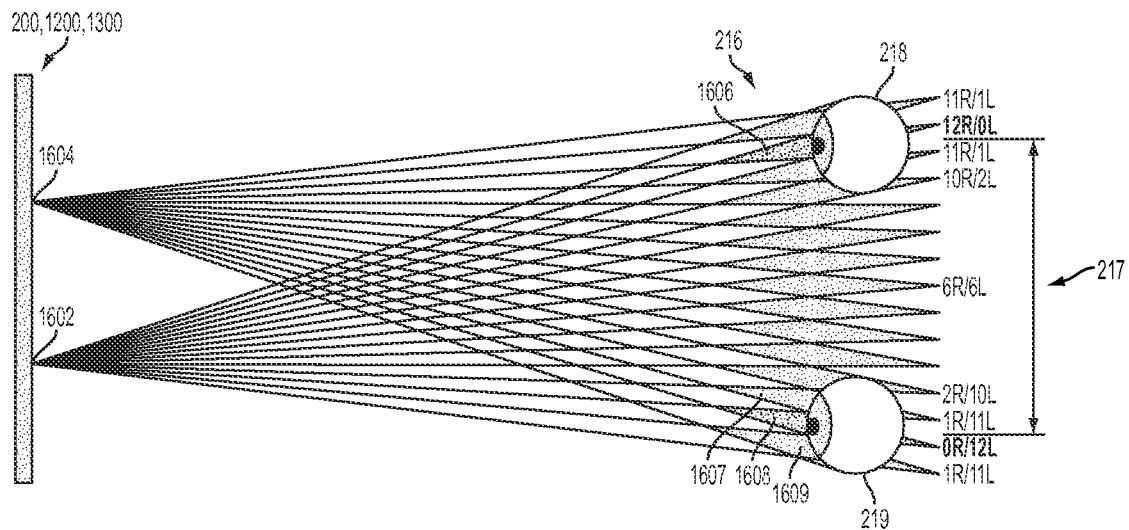
FIG. 16 is a schematic representation of an eye viewing zone.
Figure 17:
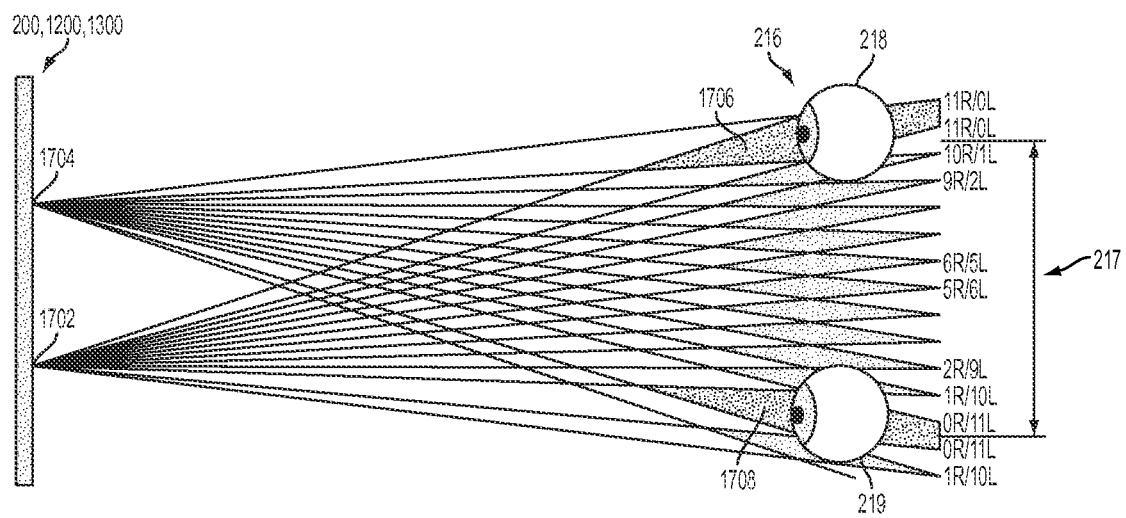
FIG. 17 is a schematic representation of an improved eye viewing zone.
Figure 18:
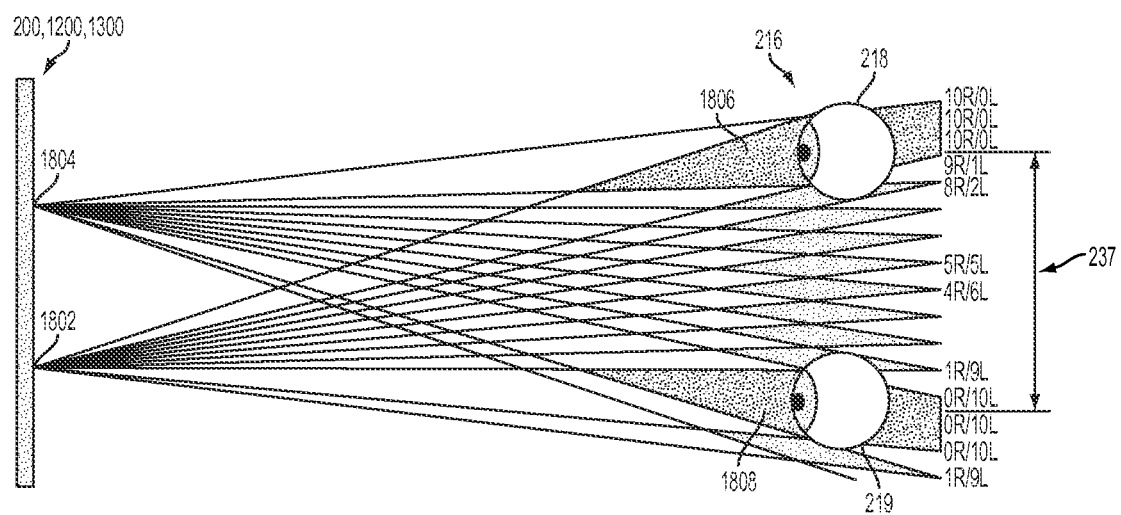
FIG. 18 is a schematic representation of another improved eye viewing zone.

FIGS. 16, 17 and 18 illustrate effects of the various embodiments described hereinabove in terms of observable viewing zones. For example, FIG. 16 is a schematic representation of an eye viewing zone. The illustration of FIG. 16 is applicable to any one of the display systems 200, 1200 and 1300. Two arbitrary points 1602 and 1604 are shown on the display. These points, like any other point of the display, are visible by both the right eye 218 and the left eye 219 of the viewer 216. An interocular distance 217 shown between the right eye 218 and the left eye 219 may for example be equal to 65 mm. For a given arrangement of the display system, in which the tracking system 210 and the controller 208 ensure proper alignment of the image patterns, the left eye 219 perceives 12 left sub-pixels (N is set to 4 pixels i.e. 12 sub-pixels in the non-limiting embodiments of FIGS. 16, 17 and 18) and 0 right sub-pixel; otherwise stated, the left eye 219 sees images from the display without any 3D cross-talk, within a zone 1608. The right eye 218 also sees images from the display without any 3D cross-talk, within a zone 1606, perceiving 12 right sub-pixels and 0 left sub-pixel.

If the viewer 216 moves slightly to the left, the eye 219 being in zone 1609, or to the right, the left eye being in zone 1607, the left eye 219 may perceive some 3D cross-talk since 1 right sub-pixel will be perceived, along with only 11 left sub-pixels. Of course, the tracking system 210 will adjust the alignment of the image patterns to overcome this effect, thereby reducing or eliminating again the 3D cross-talk so that the left eye 219 may once again see 12 left sub-pixels while the right eye 219 sees 12 right sub-pixels.

In order to prevent 3D cross-talk when an eye moves away from its zone 1606 or 1608, the display system may turn off a 3D portion of a pixel or sub-pixel at a junction of alternate patterns. A resulting missing color intensity may be compensated by adjacent pixels or sub-pixels of a same color, as expressed hereinabove. FIG. 17 is a schematic representation of an improved eye viewing zone. The same interocular distance 217 is shown between the right eye 218 and the left eye 219. Two arbitrary points 1702 and 1704 are viewed by both eyes of the viewer 216, in broader zones 1706 and 1708. Within these zones, each eye perceives 11 left or right sub-pixels, as appropriate for the relevant eye, without 3D crosstalk. The zones 1706 and 1708 are broader, which reduces performance requirements on the accuracy and speed of the tracking system 210. A modest reduction of 3D resolution, for example from 12 to 11 sub-pixels, is obtained without any 2D resolution degradation.

In order to accommodate for various interocular distances and for various distances between the viewer 216 and the screen, the display system may turn off more pixels or sub-pixels while increasing intensity of more surrounding pixels or sub-pixels. FIG. 18 is a schematic representation of another improved eye viewing zone. Two arbitrary points 1802 and 1804 are viewed by both eyes of the viewer 216, in even broader zones 1806 and 1808. The viewer 216 may move closer to or further away from the screen, or may have a small interocular distance 237, for example an interocular distance of 58 mm in the case of a child. The eyes 218 and 219 remain within the zones 1806 and 1808 respectively. There is no 3D cross-talk within the zones 1806 and 1808. There is some reduction of 3D resolution, down from 12 sub-pixels in FIG. 16 to 10 sub-pixels. However, since some sub-pixels surrounding the turned off ones have an increased intensity, there is no reduction of luminance and no loss of 2D resolution.

Figure 19:
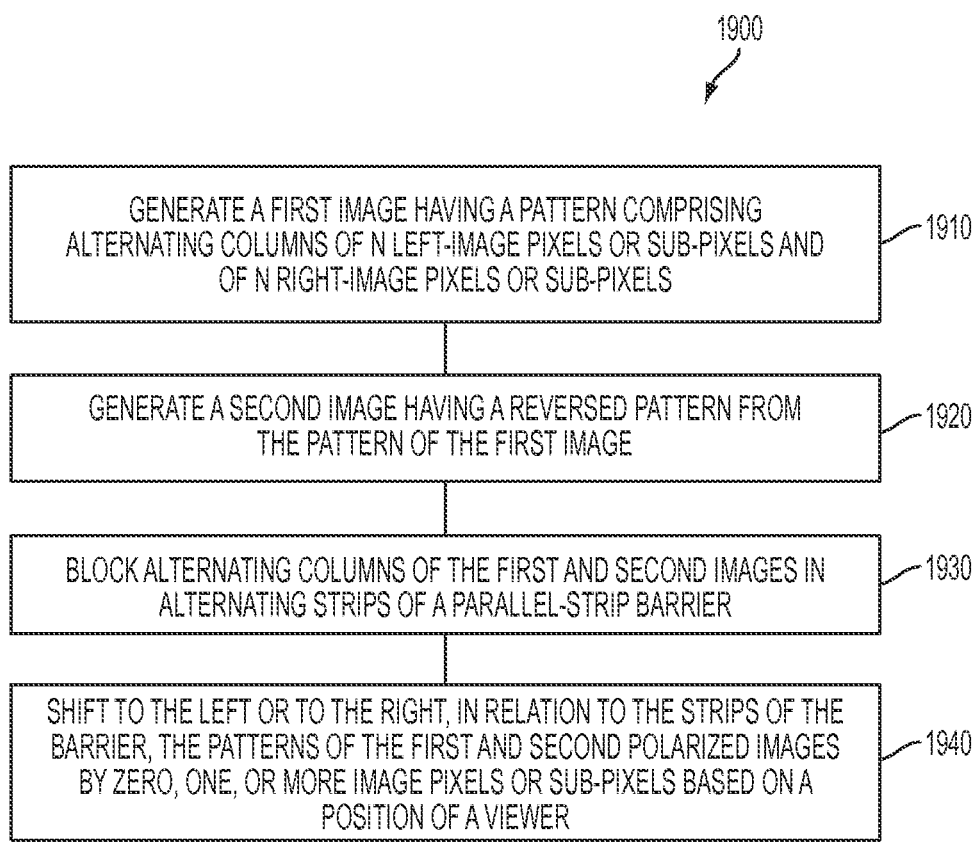
FIG. 19 shows a generic method for displaying a stereoscopic image according to a further embodiment.

FIG. 19 shows a generic method for displaying a stereoscopic image according to a further embodiment. A sequence 1900 comprises a plurality of steps that may be executed in variable order, at least some of the steps possibly being executed concurrently. The sequence 1900 comprises a step 1910 of generating a first image. The first image has a pattern comprising alternating columns of N left-image pixels or sub-pixels and of N right-image pixels or sub-pixels. In step 1920, a second image is generated. The second image has a pattern that is reversed from the pattern of the first polarized image. At step 1930, alternating columns of the first and second images are blocked in alternating strips of a parallel-strip barrier. Strips of the parallel-strip barrier form a pattern that is complementary to the patterns of the first and second image.

It may be observed that the sequence 1900 may be implemented using any of the display systems 200, 1200 or 1300 or similar displays, whereby light from the backlight 201 or from another light source may pass through the screen and then through the barrier, or through the barrier and then through the screen. Consequently, the parallel-strip barrier may block alternating columns of the first and second images after generation of these images, as in the case of FIGS. 2a, 2b, 3 and 11 or may block light from the light source before image generation, as in the case of FIGS. 13 and 14.

At step 1940, the patterns of the first and second polarized images are shifted to the left or to the right, in relation to the strips of the barrier, as a function of a position of a viewer of the stereoscopic image. Based on the position of the viewer, the patterns of the first and second polarized images may be shifted by zero, one, or more pixels or sub-pixels. As will be expressed hereinbelow, variants of the display systems 200, 1200 and 1300 presented hereinabove may involve parallel-strip barriers having moving strips. As a result, the sequences 100 and 1100 introduced earlier are generalized in the sequence 1900 by specifying, at step 1940, shifting the patterns of the first and second polarized images in relation to the strips of the barrier.

Some variants may include barriers having a different strip width from that of the image patterns. Other variants involve variable image pattern widths used with variable barrier strip widths. Yet other variants involve moving barrier strips. Still other variants may include two of more of these features, for example moving barrier strips having a different width from that of the image patterns. Some of these variants may be realized using a multiple sub-strip barrier, which will now be described.

Figure 20A:
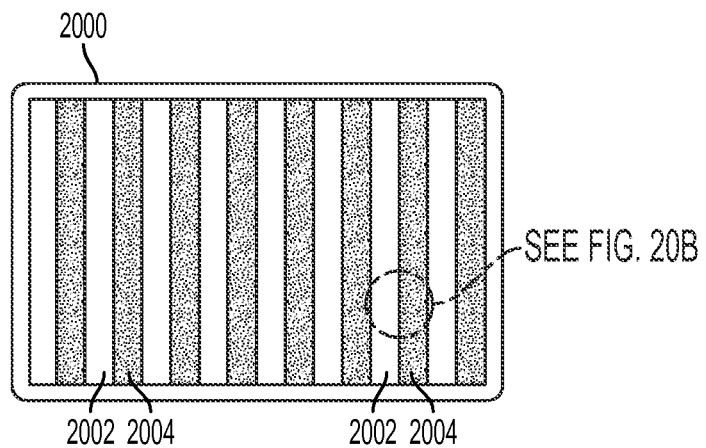
FIG. 20A shows details of a multiple sub-strip barrier.
Figure 20B:
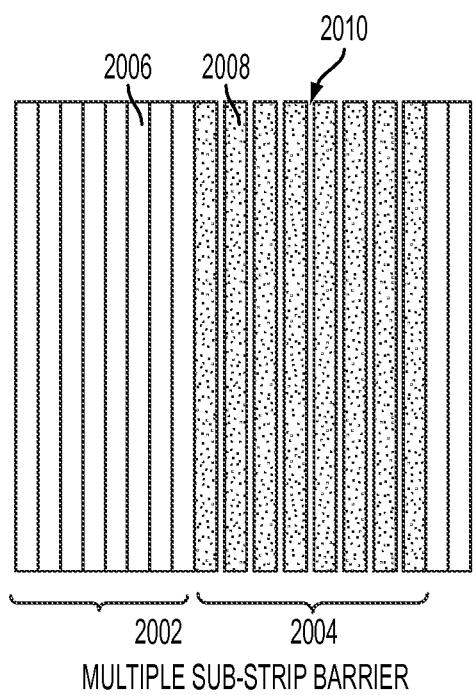
FIG. 20B is an enlarged view of the multiple sub-strip barrier of FIG. 20A.
Figure 21A:
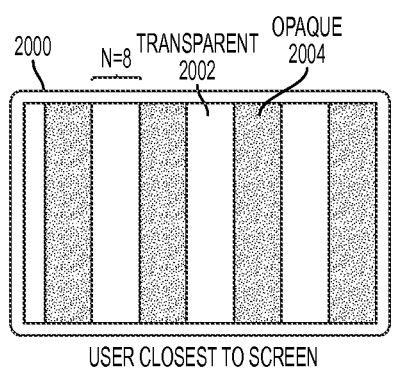
FIG. 21 illustrates variability of a column width of a barrier according to an embodiment.
Figure 21C:
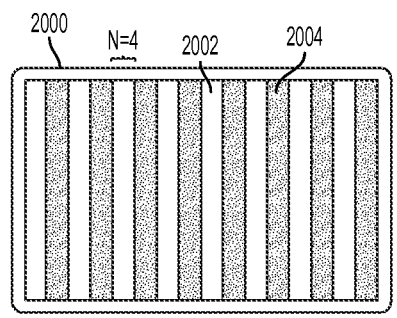
Figure 21B:
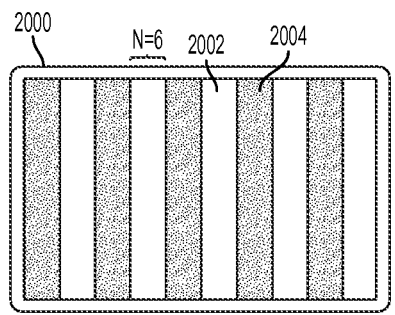
Figure 21D:
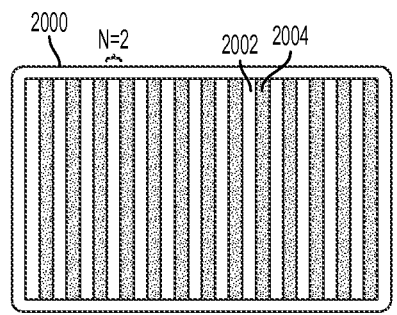

FIG. 20A shows details of a multiple sub-strip barrier. FIG. 20B is an enlarged view of the multiple sub-strip barrier of FIG. 20A. Referring at once to FIGS. 20A and 20B, a multiple sub-strip barrier 2000 may be used to add flexibility to widths of the barrier and, consequently, to the widths of image columns. The barrier 2000 as shown is an active shutter. Each passing strip 2002 and each blocking strip 2004 of barrier 2000 is divided into a plurality of sub-strips 2006, 2008. Each sub-strip 2006, 2008 of the barrier 2000 is programmable and/or electrically controllable, allowing control of a width of the strips 2002, 2004 by turning on and off a number of sub-strips 2006, 2008.

Typically, a sub-strip 2006, 2008 may have a width of about 400 microns, for a 60-cm high-definition display. A gap 2010 in the order of about 5 to 20 microns is present between each sub-strip 2006, 2008. The gap 2010 provides electrical isolation between adjacent sub-strips 2006, 2008. The presence of gaps 2010 may cause between 1.25 to 5% crosstalk between images since a blocking strip 2004 may allow some light to pass through the gaps 2010. To overcome this effect, a permanent black strip (not shown) may be added on the barrier 2000, at junctions between each pair of sub-strips 2006, 2008, much like the well-known black matrix used on LCD panels. Though such black strips may create a slight moiré effect on the resulting image, this effect will remain modest due to the narrow size of the gaps 2010. It is possible to minimize further the moiré effect by axially rotating the pattern of columns of the barrier 2000, in a range between 5 and 35 degrees for example, in relation to the columns of images on the screen.

In a non-limiting example, a 1.25-pixel width of the sub-strips 2006, 2008 may be used in combinations of 2, 4 or up to 10 sub-strips 2006 or 2008 per strips 2002 or 2004. Alternatively, sub-strips 2006, 2008 having a 0.5 pixel width may also be contemplated.

FIG. 21 illustrates variability of a column width of a barrier according to an embodiment. By associating an appropriate number of sub-strips 2006, 2008 of the barrier 2000 into passing strips 2002 and blocking strips 2004, it is possible to obtain passing and blocking strips of a wide range of widths. In an embodiment, the barrier 2000 may be integrated into the system 1200 of FIG. 11 and replace the barrier 1204. In another embodiment, the barrier 2000 may be integrated into the system 1300 of FIG. 13 and replace the barrier 1304. Regardless, the tracking system 210 provides to the controller 208 a measurement of a distance between the viewer 216 and a display system incorporating the barrier 2000. When the viewer 216 is very close to the display, the controller 208 may select a large number N of pixels or sub-pixels in the first and second image patterns produced by the screen 1202 or 202, and control a corresponding width of the strips 2002, 2005 of the barrier 2000 by associating an appropriate number of sub-strips 2006, 2008 into passing strips 2002 and blocking strips 2004. On FIG. 21, position (a), the viewer 216 is closest to the screen according to an example of display system design, and the value N is equal to 8 pixels, or 24 sub-pixels (FIG. 21 is not to scale). At position (d), the viewer 216 is at a farthest position from the screen according to the display system design, and the value N is equal to 2 pixels, or 6 sub-pixels. At positions (b) and (c), values of N are set to 6 and 4 pixels, respectively. Of course, other values of N may be contemplated and the values provided on FIG. 21 are for purposes of illustration and are not meant to limit the present disclosure.

Figure 22:
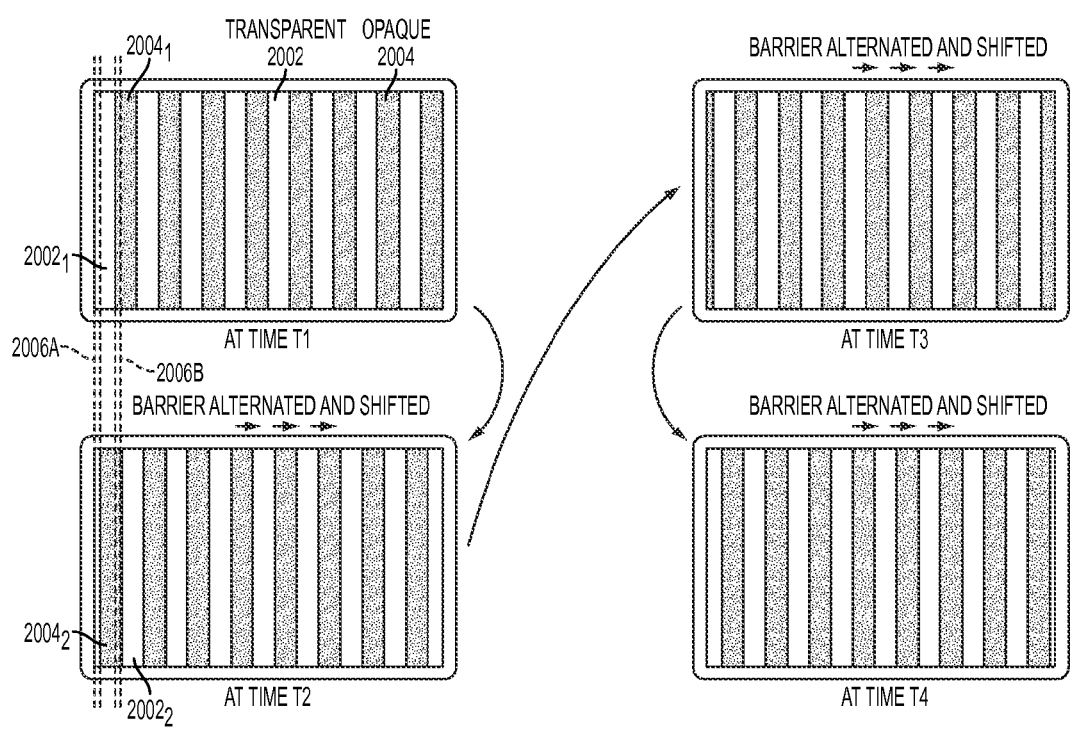
FIG. 22 illustrates a barrier in continuous motion.

As mentioned earlier, in order to prevent 3D cross-talk due to difference in viewer interocular distance, variable distance between the viewer and a display, and similar reasons, some display systems may turn off a 3D portion of a pixel or sub-pixel at a junction of alternate patterns. In order to spread this loss of 3D resolution over the display, over time, the multiple sub-strip barrier 2000 may be used for changing a position of passing and blocking strips on an ongoing basis. FIG. 22 illustrates a barrier in continuous motion. The Figure shows four (4) successive timeslots T1, T2, T3 and T4. In timeslot T1, a leftmost strip is a passing strip $2002_1$ and a next strip is a blocking strip $2004_1$. The passing strip $2002_1$ is formed by a number of passing sub-strips 2006 and the blocking strip $2004_1$ is formed by a number of blocking sub-strips 2008. In timeslot T2, most sub-strips that were earlier open are now closed, and vice-versa. The passing and blocking strips have also moved sideways by one sub-strip. Otherwise stated, one leftmost sub-strip $2006_A$ that was open at time T1 in the leftmost passing strip $2002_1$ remains open at time T2. At the same time, one leftmost sub-strip $2008_B$ that was closed in the blocking strip $2004_1$, remains closed as is part of strip $2004_2$. This applies over the width of the barrier 2000. The process continues at timeslots T3, T4 and so on.

Of course, this movement of the passing and blocking strips of the barrier 2000 is coordinated with generation of images. For example, the controller 208 may ensure that image generation on the screen 202 or 1202 tracks the movement of the strips on the barrier 2000. Consequently, assuming no movement of the viewer in front of the display system, the first and second images are shifted in the same direction and at a same rate as the strips of the barrier 2000. If the user moves sideways, patterns of the first and second images are shifted to the left or to the right in relation to the moving strips of the barrier.

Changing the position of passing and blocking strips may for example occur once every two (2) timeslots. For example for a 120 Hz LCD, the barrier 2000 may alternate passing or blocking states of its strips every $\frac{1}{60}^{th}$ of a second and the strip patterns may shift sideways by one sub-strip every $\frac{1}{30}^{th}$ of a second. In this case, some pixels or sub-pixels remain blocked, or turned off, longer than others. However, off pixels or sub-pixels still only occur at a 30 Hz rate and will essentially remain undetectable by most viewers.

Figure 23:
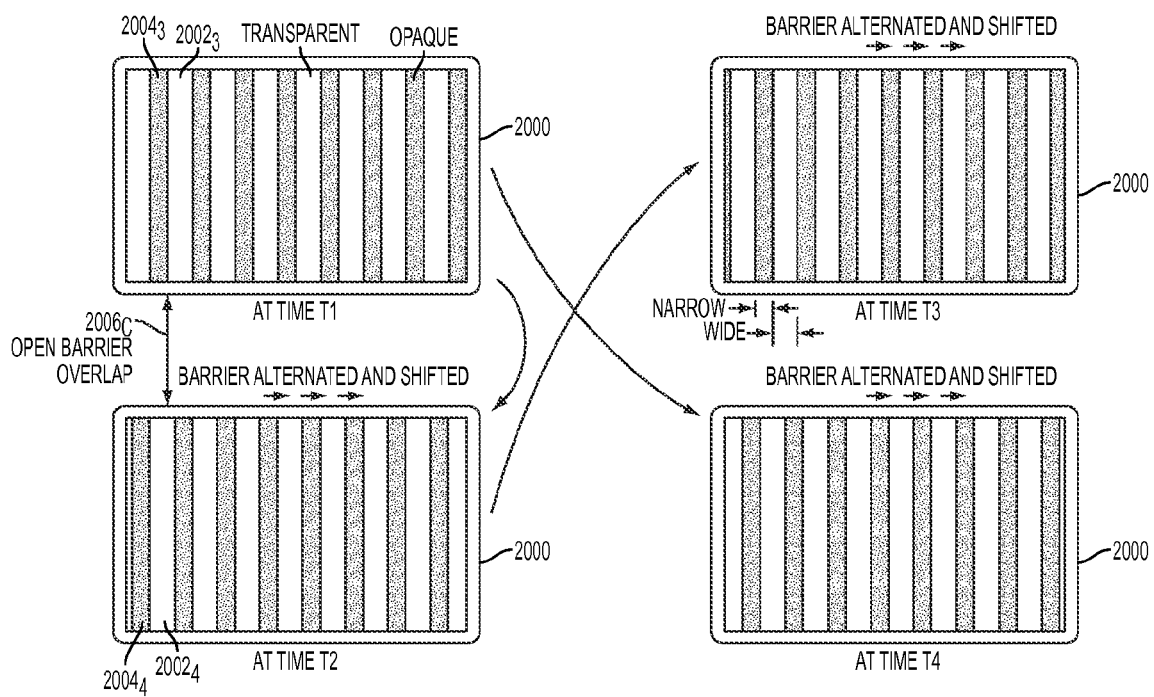
FIG. 23 illustrates an uneven barrier in continuous motion.

Time duration of off pixels or sub-pixels may be reduced even further. FIG. 23 illustrates an uneven barrier in continuous motion. The passing strip 2002 is made slightly wider than the blocking strip 2004. At time T1, a passing strip $2002_3$ and a narrower blocking strip $2004_3$ are shown. Then at time T2, a blocking strip $2004_4$ and a passing strip $2002_4$ are shown. One sub-strip $2006_C$ remains open in both passing strips $2002_3$ and $2002_4$. No sub-strip is now turned off more than $\frac{1}{60}^{th}$ of a second. Image pixels or sub-pixels that remain visible by the viewer via barrier sub-strips that are open over two (2) consecutive timeslots may be restricted by the screen 202 or 1202 to showing 2D information, in order to reduce crosstalk. Additionally, brightness of these pixels or sub-pixels may be reduced in half by the screen 202 or 1202 in order to maintain overall constant image brightness. Those of ordinary skill in the art will appreciate that image pixels or sub-pixels visible over two (2) consecutive timeslots change position over time, at a rapid rate. They will also appreciate that rotating the strips of the barrier 2000 at an angle in relation to the image patterns can distribute further such pixels over the display system.

Figure 24A:
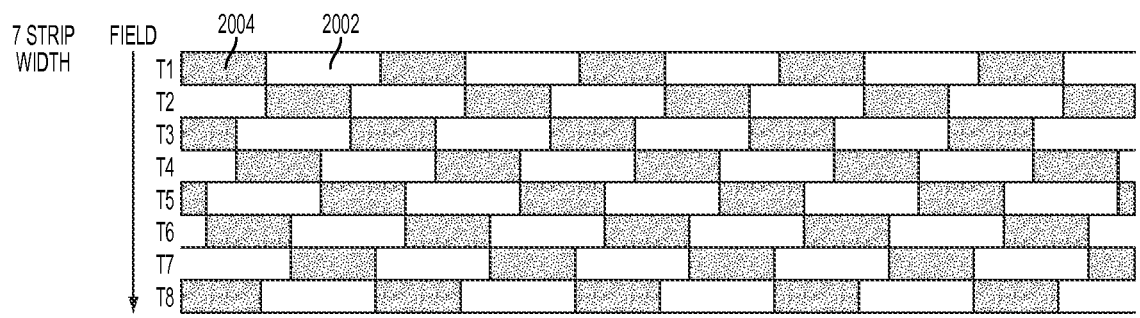
FIGS. 24A and 24B are time step views of the barrier of FIG. 23.
Figure 24B:
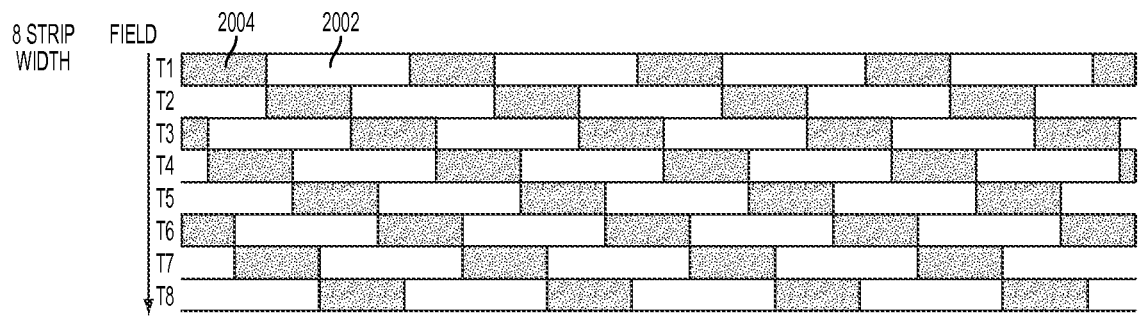

FIGS. 24A and 24B are time step views of the barrier of FIG. 23. In a top part (a), each passing strip 2002 includes 7 sub-strips and each blocking strip 2004 includes 6 sub-strips. In a bottom part (b), each passing strip 2002 includes 8 sub-strips and each blocking strip 2004 includes 6 sub-strips. Other configurations may also be contemplated. Both FIGS. 24A and 24B reproduce the concepts illustrated in FIG. 23. Each row (T1 to T8) represents an entire screen 2000 (schematically, not to scale) over one timeslot. It can be observed that, as each strip alternates between open and closed (passing and blocking) positions, they also move sideways. The passing strips 2002 being wider than the blocking strips 2004, some sub-strips remain open for two consecutive timeslots.

Figure 25:
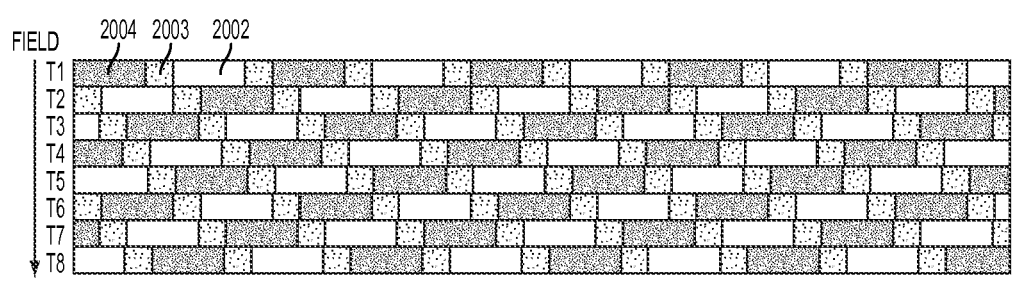
FIG. 25 is an alternative time step view of the barrier of FIG. 23.

FIG. 25 is an alternative time step view of the barrier of FIG. 23. In FIG. 25, a variant of the multiple sub-strip barrier 2000 includes sub-strips that may acquire three (3) distinct states, including blocking, passing, or half-passing. Comparing FIGS. 24B and 25, sub-strips that remain open in two consecutive timeslots in FIG. 24B adopt a half-pass state 2003 in FIG. 25. This provides an alternative solution to dimming pixels or sub-pixels on the screen 202 or 1202 when these are visible by the viewer via barrier sub-strips that are open over two (2) consecutive timeslots.

As mentioned hereinabove, opening and closing of vertical strips of a barrier such as the barriers 1204, 1304 and 2000 may be performed at 120 Hz. The rate is sufficient to provide an appearance of brightness uniformity over the screen 202. However, when the viewer 216 user blinks the eyes, last bright and dark vertical strips displayed just before the blinking can be registered in the viewer's retina and temporarily break the brightness uniformity. This effect may be perceived as flickering. An embodiment of the present disclosure aiming at reducing or eliminating such flickering will now be described.

Figure 26:
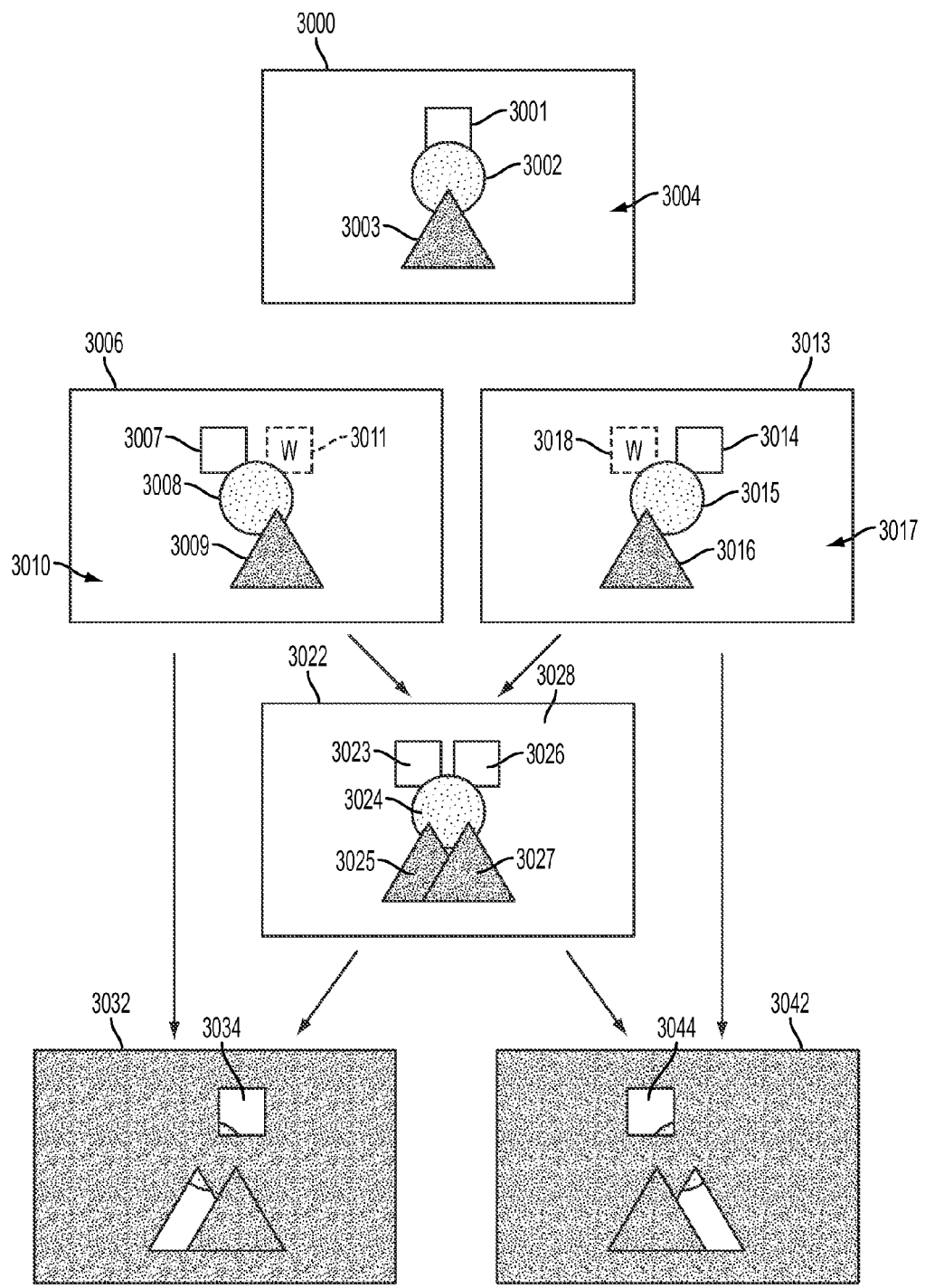
FIG. 26 shows a decomposition of a stereo image into a common luminance image and into left and right delta images.

FIG. 26 shows a decomposition of a stereo image into a common luminance image and into left and right delta images. FIG. 26 shows a monoscopic image 3000 that reflects a two-dimensional view of a stereoscopic image that should be perceived by the viewer 216.

The monoscopic image 3000 comprises four (4) elements including a square 3001, a circle 3002, a triangle 3003 and a background 3004. For illustration purposes and without limiting the present disclosure, the square 3001 is entirely of a uniform shade of grey and the background 3004 is entirely white. Still for illustration purposes and without limiting the present disclosure, colors of the monoscopic image 3000 are encoded with the well-known RGB protocol in which a value 0 indicates no luminance while a value 255 indicates full luminance. Hence a luminance of the square 3001 may be (180:180:180), since the square 3001 is of a shade of grey. A luminance of the circle 3002 may be (125:125:125) and a luminance of the triangle 3003 may be (62:62:62), denoting darker shades of grey. A luminance of the background 3004 is (255:255:255) since the background 3004 is entirely white. For purposes of illustration, the circle 3002 and the triangle 3003 may have any other color as long as they are distinct from the square 3001 and from the background 3004.

The scenery of the monoscopic image 3000 is viewed in three dimensions with a left image 3006 and a right image 3013. The left image 3006 comprises four (4) elements corresponding to a left view of the elements of the stereoscopic image 3000, including a square 3007, a circle 3008, a triangle 3009 and a background 3010. Since the same elements are found in the stereoscopic image 3000 and in the left image 3006, corresponding elements are of the same colors, with the same luminance. Hence, a luminance of the square 3007 is (180:180:180) while a luminance of the background 3010 is (255:255:255). The background 3010 includes a portion 3011, which is also white and is not distinguishable from the complete background 3010.

The right image 3013 comprises four (4) elements corresponding to a right view of the elements of the stereoscopic image 3000 including a square 3014, a circle 3015, a triangle 3016 and a background 3017. Since the same elements are found in the stereoscopic image 3000 and in the right image 3013, corresponding elements are of the same colors, with the same luminance. Hence, a luminance of the square 3014 is (180:180:180) while a luminance of the background 3017 is (255:255:255). The background 3017 includes a portion 3018, which is also white and is not distinguishable from the complete background.

A composite image 3022 is generated, for example by the image source 206 of earlier Figures. The composite image 3022 has, for each sub-pixel, a highest common luminance of corresponding sub-pixels of the left and right images 3006 and 3013. Considering for example the square 3007 of the left image 3006, which has a luminance (180:180:180), a location of its sub-pixels within an area of the left image 3006 correspond to a location of the portion 3018 of the right image 3013, which has a luminance (255:255:255). The highest common luminance for a corresponding area 3023 of the composite image 3022 is then (180:180:180), denoting the shade of grey of the squares 3001 and 3007. Likewise, a highest common luminance for an area 3026 reflects sub-pixel positions of the white portion 3011 of the left image 3006 and of the square 3014, the area 3026 therefore being of the same shade of grey (180:180:180). Other areas 3024, 3025 and 3027 are formed by similar sub-pixel by sub-pixel selection of highest common luminance values of the various elements of the left image 3006 and of the right image 3013. A background 3028 has white luminance (255:255:255) and corresponds to sub-pixels that are white on both of the left image 3006 and the right image 3013.

A left delta image 3032 is obtained in the image source 206 by subtracting, from each sub-pixel of the left image 3006, a luminance of a corresponding sub-pixel of the composite image 3022. A right delta image 3042 is obtained in the image source 206 by subtracting, from each sub-pixel of the right image 3013, a luminance of a corresponding sub-pixel of the composite image 3022. For example, subtracting the luminance of the area 3026 (180:180:180), from the luminance of the portion 3011 (255:255:255), denoting white, produces in the left delta image 3032 an area 3034 with a luminance (75:75:75), denoting another shade of grey. Likewise, subtracting the luminance of the area 3023 (180:180:180), from the luminance of the portion 3018 (255:255:255), denoting white, produces in the right delta image 3042 an area 3044, also with a luminance (75:75:75). As illustrated, large parts of the left and right images 3006 and 3013 contain white backgrounds 3010 and 3017. Accordingly, a large part of the composite image 3022 also comprises a white background 3028. The left and right delta images 3032 and 3044 being obtained by subtracting, on a per sub-pixel basis, the luminance of the composite image 3022 from the luminance of the left and right images 3006 and 3013, large parts of the first and second images have no luminance (0:0:0) and are therefore black.

The aforementioned description of FIG. 26 may be modified by substituting the RGB protocol, which uses a range of 0-255 to express luminance levels, with any other well-known protocol. For example, sub-pixel luminance may be expressed in percentages of a full luminance capability of an LCD display. In the description of FIG. 26, it has being assumed that the RGB protocol of 0-255 used previously has a linear luminance response over the 0-255 range, meaning for example that a luminance value of 64 added to a luminance value of 128 would result in a luminance value of 192.

In practice, there may be a non-linear response between a calculated luminance value and a luminance of a display, as in the case of the commonly used gamma encoding. This non-linear response may change the calculation of luminance levels of the left and right images 3006 and 3013, of the composite image 3022 and of the delta images 3032 and 3034. The above description is presented using a linear luminance response of the RGB protocol for simplicity of illustration and does not limit the present disclosure. Those of ordinary skill in the art having the benefit of the present disclosure will be able to calculate luminance levels of each element in the various images 3006, 3013, 3022, 3032 and 3042, based on the elements of the stereoscopic image 3000 and based on particular characteristics of a screen integrated in an autostereoscopic display system.

Figure 27:
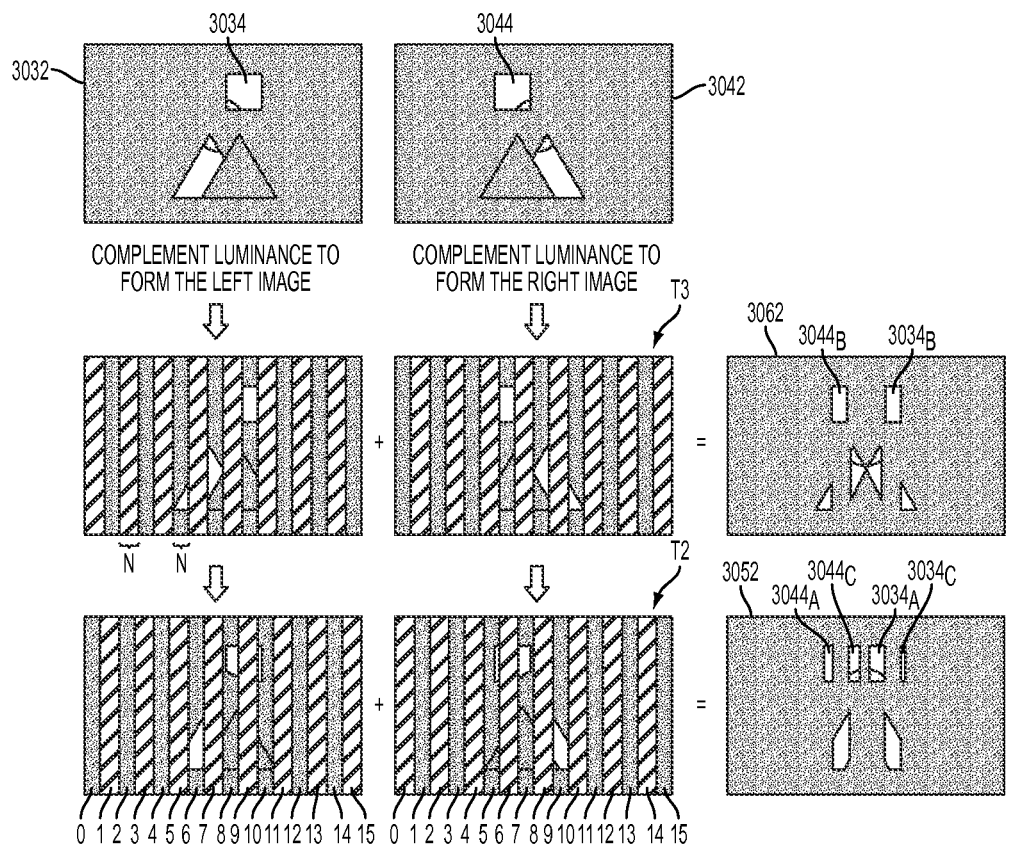
FIG. 27 shows combinations of the left and right delta images of FIG. 26, the left and right delta images being spread during two timeslots over two images having complementary patterns.

FIG. 27 shows combinations of the left and right delta images of FIG. 26, the left and right delta images being spread during two timeslots over two images having complementary patterns. FIG. 27 illustrates schematically a process that may be performed in the image source 206.

During a timeslot T2, even-numbered columns 0, 2, 4, 6, . . . of N pixels or sub-pixels of the left delta image 3032 are combined with odd-numbered columns 1, 3, 5, 7, . . . of N pixels or sub-pixels of the right delta image 3042 to form a first image 3052 having alternating columns of N left-delta-image pixels or sub-pixels and of N right-delta-image pixels or sub-pixels. During a timeslot T3, odd-numbered columns of N pixels or sub-pixels of the left delta image 3032 are combined with even-numbered columns of N pixels or sub-pixels of the right delta image 3042 to form a second image 3062 having a reversed pattern from the pattern of the first image 3052. As a result, during T2, parts $3034_A$ and $3034_C$ of the area 3034 as well as parts $3044_A$ and $3044_C$ of the area 3044 are part of the first image 3052. During a timeslot T3, a part $3034_B$ of the area 3034 and a part $3044_B$ of the area 3044 are part of the second image 3062.

Figure 28:
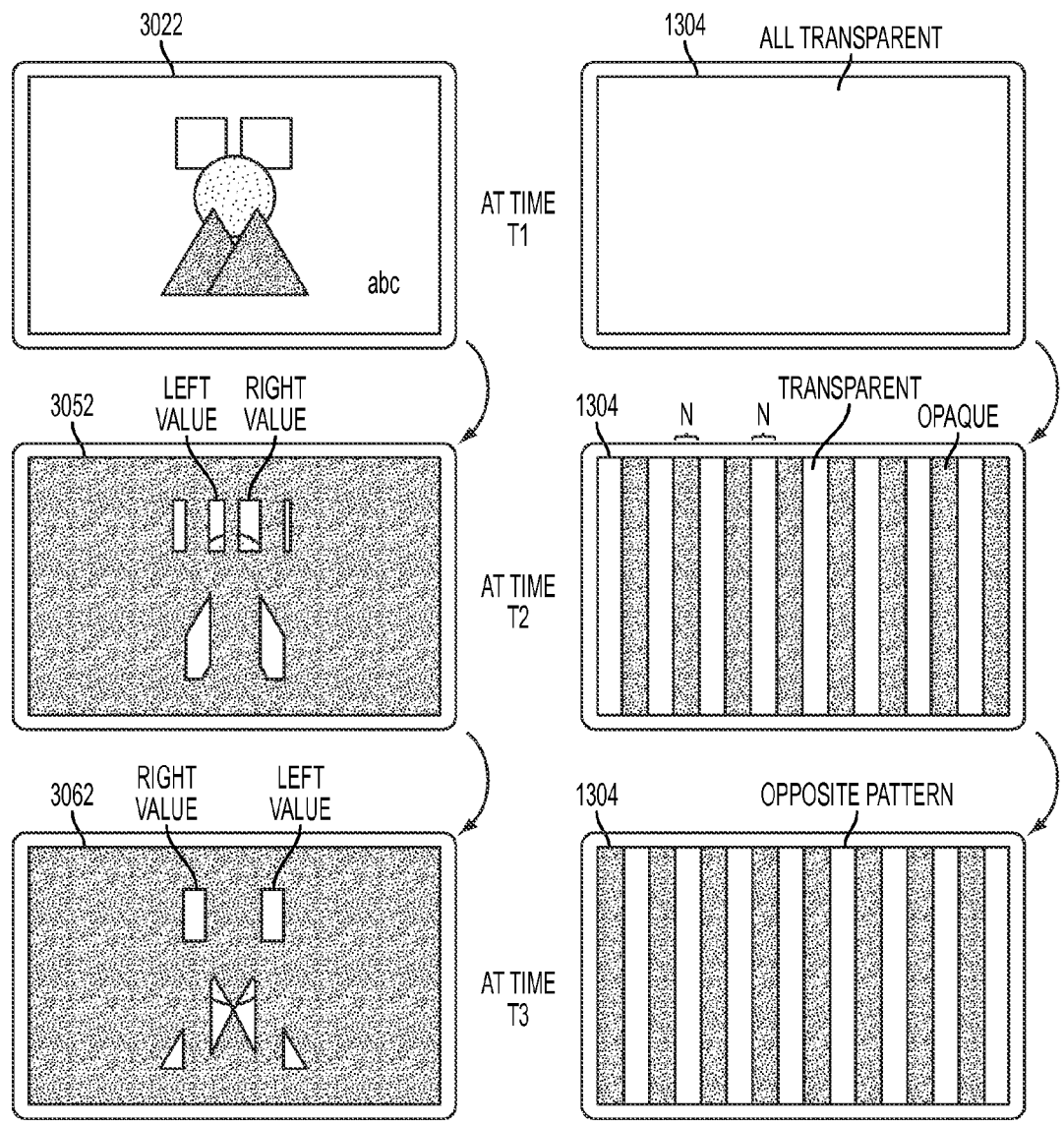
FIG. 28 illustrates three timeslots of a tri-phase active barrier autostereoscopic system.

FIG. 28 illustrates three timeslots of a tri-phase active barrier autostereoscopic system. In addition to showing patterned images over two timeslots, the tri-phase active barrier autostereoscopic system also shows, over an additional timeslot, non-stereoscopic image portions that do not create any flickering effect, without any further artifact that could occur as a result of using an active barrier.

Control of the barrier 1204, 1206, 1304 or 2000 is modified in order to allow an all-transparent mode of the barrier 1204, 1206, 1304 or 2000 during a first timeslot T1 while passing or blocking light in alternating strips of the barrier 1204, 1206, 1304 or 2000 during timeslots T2 and T3. During T1, the image source 206 supplies the composite image 3022 to the screen 202 while the controller 208 maintains the barrier 1204, 1206, 1304 or 2000 in all-transparent mode, allowing the composite image 3022 to be fully displayed without blocking. During T2, the image source 206 supplies the first image 3052 to the screen while the controller 208 maintains the barrier 1204, 1206, 1304 or 2000 in a first mode as described in the foregoing description of FIGS. 11, 12, 13 and 20. During T3, the image source 206 supplies the second image 3062 to the screen while the controller 208 maintains the barrier 1204, 1206, 1304 or 2000 in a second mode opposite from the first mode. The screen 202 therefore displays the first image 3052, the second image 3062 and the composite image 3022 over three successive timeslots. The process continuously repeats the sequence between T1, T2 and T3.

In a variant, because a tri-phase active barrier autostereoscopic system uses three (3) timeslots, the barrier 1204, 1206, 1304 or 2000 may be configured to alternate between the timeslots at rate of 180 Hz.

Of course, the manner of generating the first and second images 3052 and 3062 in addition to the composite image 3022, as expressed in the description of FIGS. 26 to 28, may be incorporated in the above described systems 1200 and 1300 using the tracking system 210 to shift to the left or to the right, in relation to the strips of the barrier, the patterns of the first and second images 3052 and 3062 by a number of image pixels or sub-pixels as a function of a position of a viewer of the stereoscopic image. In the tri-phase active barrier autostereoscopic system, the multiple sub-strip barrier 2000 may be used so that features incorporating variable barrier widths, continuously motion of the barrier, unequal width of passing and blocking strips and pixel or sub-pixel dimming may all be used.

Figure 29:
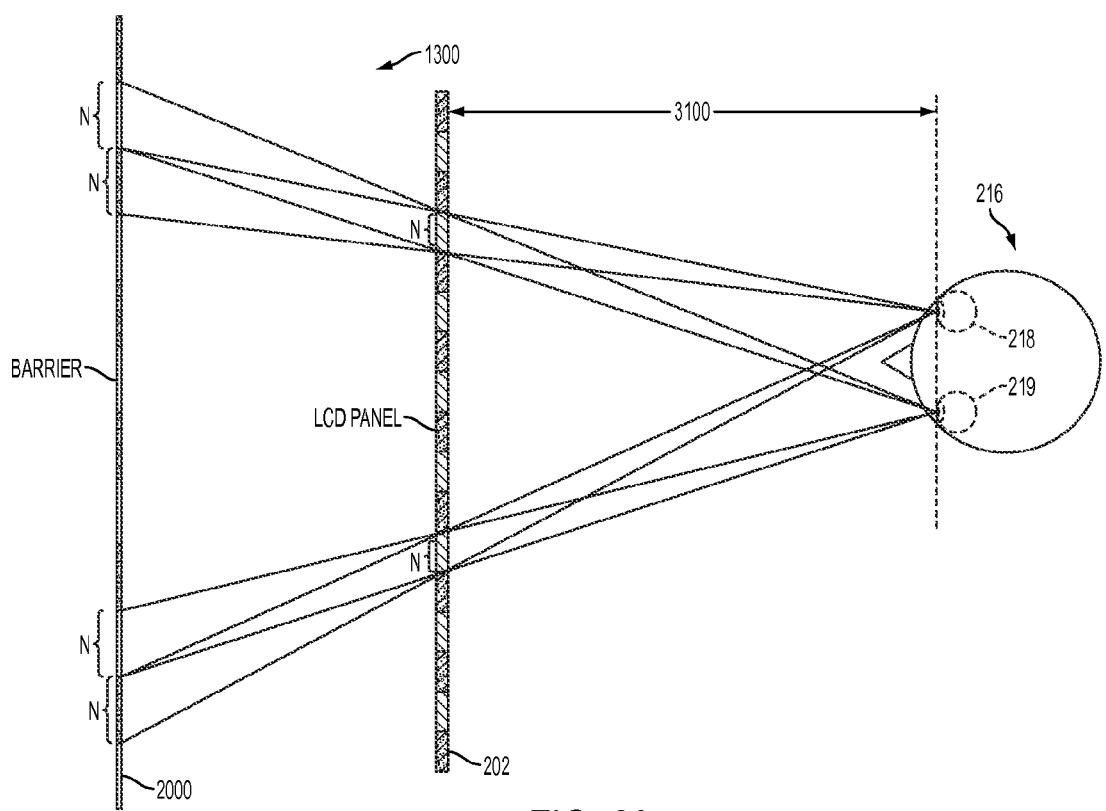
FIG. 29 is a simplified view of a user in front of an autostereoscopic system.

As expressed in the foregoing description of FIG. 21, the column width of the barrier may be selected according to a distance between the viewer 216 and the system 1300 when the system is modified to integrate the multiple sub-strip barrier 2000. In the description of FIG. 21, it is assumed that the number N of pixels or sub-pixels in columns of the image patterns is constant over a width of the first and second images, that is, over the width of the screen 202. FIG. 29 is a simplified view of a user in front of an autostereoscopic system. FIG. 29 only shows the screen 202 and the barrier 2000 of a display of the display system 1300 in order to simplify the description of an embodiment.

Figure 30:
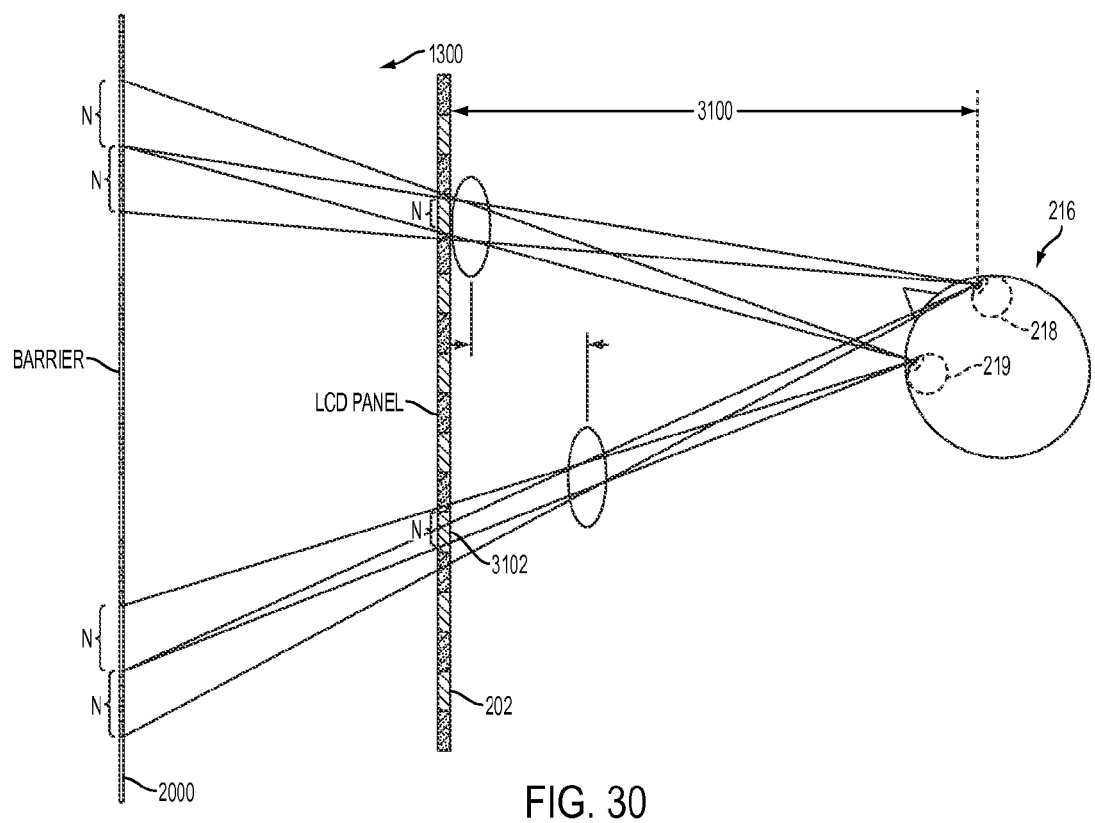
FIG. 30 shows head yaw rotation of the user of FIG. 29, causing an unequal parallax distance.

A value N of pixels or sub-pixels as shown on FIG. 29 has been selected or adjusted according to a distance 3100, measured by the tracking system 210, between the eyes 218 and 219 of the viewer 216 and the screen 202. A constant value of N over the width of the display is appropriate in the case of FIG. 29. FIG. 30 shows head yaw rotation of the user of FIG. 29, causing an unequal parallax distance due to a variation of apparent interocular distance. The effect of head yaw rotation is greatly exaggerated on FIG. 30, for illustration purposes. On FIG. 30, the viewer has turned his head sideways. The tracking system 210 may provide a distance 3100 between the right eye 218 and the screen 202 for calculating of a value of N used on the screen 202 and on the barrier 2000. However, because the left eye 219 of the viewer 216 is closer to the screen, alignment is lost between the eyes 218 and 219 of the viewer and columns 3102 on a left hand side of the screen 202.

A small rotation of the head may be accommodated by the improved eye viewing zone as shown in the foregoing description of FIGS. 17 and 18. However, this may not suffice to overcome detrimental effects of the unequal parallax distance in some applications or for large amounts of head yaw rotation.

Figure 31:
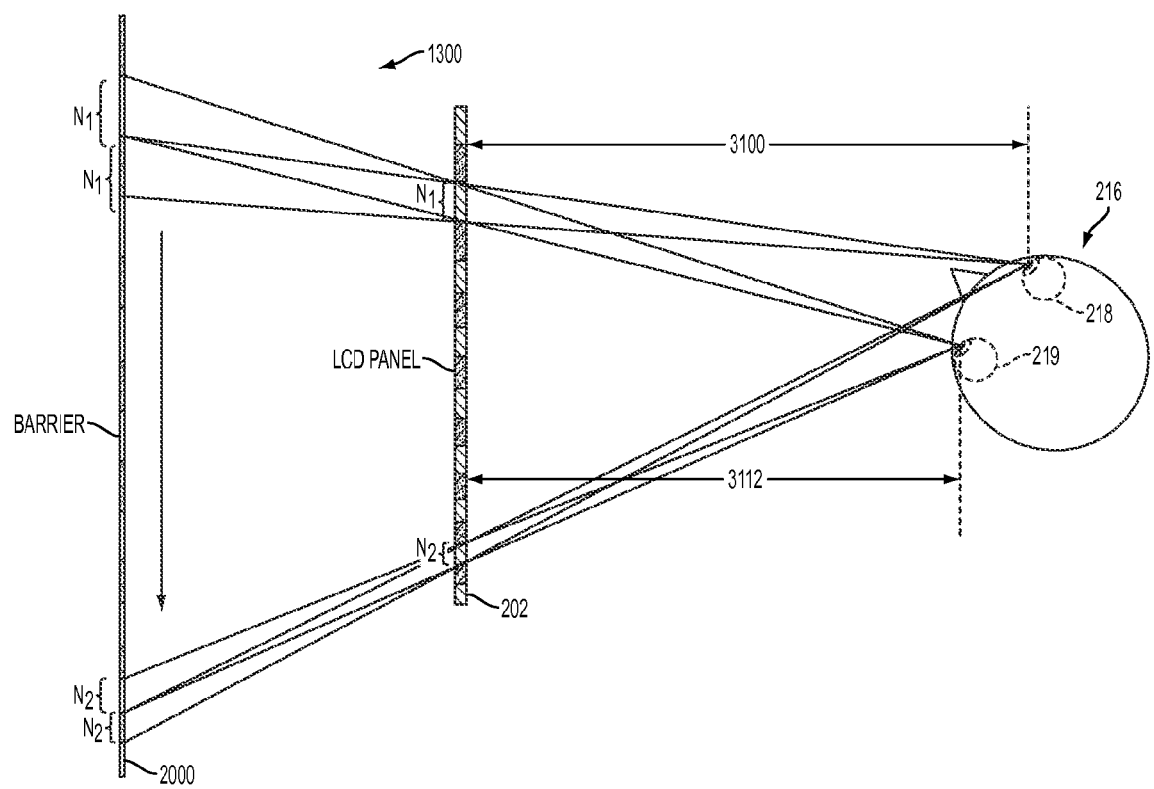
FIG. 31 shows a variable pattern width of an image pattern and barrier according to an embodiment.

FIG. 31 shows a variable pattern width of an image pattern and barrier according to an embodiment. The head tracking system 210 measures a distance between the viewer's left eye 219 and the display showing the stereoscopic image, for example by measuring a distance 3112 between the viewer's left eye 219 and the screen 202. The head tracking system 210 also measures a distance 3110 between the stereoscopic image and the viewer's right eye 218. It may be observed that high quality head tracking systems are currently available and are capable of providing the above measurements, including a position of a viewer's head, positions of each of the viewer's eyes, and head rotation about three (3) axes including pitch, yaw and roll.

A column width $N_1$ is calculated based on the distance 3110. A separate column width $N_2$ is calculated on based on the distance 3112. The value $N_1$ applies at a rightmost extremity of the screen 202 and of the barrier 2000. The value $N_2$ applies at a leftmost extremity of the screen 202 and of the barrier 2000.

If the viewer 216 is facing the screen 202 without head rotation, as shown on FIG. 29, the same value $N=N_1=N_2$ is used across the display, for both of the screen 202 and for the barrier 2000. If however the values $N_1$ and $N_2$ are not equal, the column width N is made to vary across widths of the screen 202 and of the barrier 2000.

If the right eye 218 is further away than the left eye 219, the number N of pixels or sub-pixels per column of the first and second image patterns is varied over a width of the first and second images so that an increasing value of N is used from the left to the right of screen 202 and barrier 2000, the value N being interpolated between a smaller $N_2$ and a larger $N_1$.

If the right eye 218 is closer than the left eye 219, the number N of pixels or sub-pixels per column of the first and second image patterns is varied over the width of the first and second images so that a decreasing value of N is used from the left to the right of screen 202 and barrier 2000, the value N being interpolated between a larger $N_2$ and a smaller $N_1$.

Interpolation between values of $N_1$ and $N_2$ in order to provide appropriate values of N for each column of the display can be made using simple trigonometry and appropriate calculations are expected to be within the capabilities of those of ordinary skill in the art. The controller 208 may make the calculations on a real-time basis or store interpolation tables in a memory (not shown) for various values of $N_1$ and of $N_2$.

Of course, the manner of adjusting and interpolating values of N, as expressed in the description of FIGS. 29 to 31, may be incorporated in the above described system 1300 using the tracking system 210 to shift to the left or to the right, in relation to the strips of the barrier, the patterns of the first and second images by a number of image pixels or sub-pixels as a function of a position of a viewer of the stereoscopic image. Variable pattern width may also be incorporated in the tri-phase active barrier autostereoscopic system. The multiple sub-strip barrier 2000 being used, features incorporating variable barrier widths, continuously motion of the barrier, unequal width of passing and blocking strips, as well as pixel or sub-pixel dimming may all be used in a system using a variable pattern width.

Those of ordinary skill in the art will realize that the description of the devices and methods for showing stereoscopic images are illustrative only and are not intended to be in any way limiting. Other embodiments will readily suggest themselves to such persons with ordinary skill in the art having the benefit of the present disclosure. Furthermore, the disclosed methods and devices may be customized to offer valuable solutions to existing needs and problems related to the generation of autostereoscopic images.

Those of ordinary skill in the art will also appreciate that numerous types of video displays or other apparatuses may embody other aspects of imaging, in a same device.

In the interest of clarity, not all of the routine features of the implementations of the devices and methods for showing stereoscopic images are shown and described. It will, of course, be appreciated that in the development of any such actual implementation of video systems, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of video displays having the benefit of the present disclosure.

In accordance with the present disclosure, the components, process steps, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of process steps is implemented by a computer or a machine and those process steps may be stored as a series of instructions readable by the machine, they may be stored on a tangible medium.

Systems and modules described herein may comprise software, firmware, hardware, or any combination(s) of software, firmware, or hardware suitable for the purposes described herein. Software and other modules may reside on servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for displaying a stereoscopic image, comprising:
generating a first image having a pattern comprising alternating columns of N left-image pixels or sub-pixels and of N right-image pixels or sub-pixels;
generating a second image having a reversed pattern from the pattern of the first image;
blocking alternating columns of the first and second images in alternating strips of a parallel-strip barrier; and
shifting to the left or to the right, in relation to the strips of the barrier, the patterns of the first and second images by a number of image pixels or sub-pixels as a function of a position of a viewer of the stereoscopic image.

2. The method of claim 1, comprising:
determining the position of the viewer by tracking the eyes of the viewer;
measuring a distance between the eyes of the viewer; and
dimming one or more image pixels or sub-pixels if the distance between the eyes of the viewer in relation to a distance between the viewer and the barrier is less than a threshold where left and right image pixels or sub-pixels start to overlap as seen from the eyes of the viewer.

3. The method of claim 1, wherein:
the first image is generated during a first of two timeslots;
the second image is generated during a second of the two timeslots;
alternating strips of the barrier open and close at successive timeslots;
the strips of the barrier are divided into sub-strips;
the strips of the barrier are in continuous motion; and
the patterns of the first and second images track the continuous motion of the strips of the barrier.

4. The method of claim 3, wherein the strips of the barrier are shifted sideways by 1 or more sub-strips once every 1 or 2 timeslots.

5. The method of claim 1, wherein:
the first image is generated during a first of two timeslots;
the second image is generated during a second of the two timeslots;
alternating strips of the barrier open and close at successive timeslots;
the method further comprising adjusting the number N of pixels or sub-pixels in the first and second image patterns based on a distance between the viewer and the stereoscopic image.

6. The method of claim 1, wherein:
the first image is generated during a first of two timeslots;
the second image is generated during a second of the two timeslots;
alternating strips of the barrier open and close at successive timeslots;
the method further comprising:
generating a composite image having, for each sub-pixel, a highest common luminance of corresponding sub-pixels of left and right images;
generating the first image by subtracting, from each sub-pixel of the left image, a luminance of a corresponding sub-pixel of the composite image;
generating the second image by subtracting, from each sub-pixel of the right image, a luminance of a corresponding sub-pixel of the composite image; and
displaying the first image, the second image and the composite image over three successive timeslots;
wherein the composite image is displayed without blocking.

7. The method of claim 1, wherein:
the first image is generated during a first of two timeslots;
the second image is generated during a second of the two timeslots;
alternating strips of the barrier open and close at successive timeslots;
the method further comprising:
measuring a distance between the stereoscopic image and the viewer's left eye;
measuring a distance between the stereoscopic image and the viewer's right eye;
if the right eye is further away than the left eye, varying the number N of pixels or sub-pixels per columns the first and second image patterns, over a width of the first and second images, so that an increasing value of N is used from the left to the right of the first and second images; and
if the right eye is closer than the left eye, varying the number N of pixels or sub-pixels per columns in the first and second image patterns, over the width of the first and second images, so that a decreasing value of N is used from the left to the right of the first and second images.

8. The method of claim 1, wherein the strips of the barrier are rotated axially, in relation to the columns of the first and second image patterns, in a range of 5 to 35 degrees of rotation.

9. The method of claim 1, wherein:
the first and second images have orthogonal polarizations; and
alternating strips of the barrier have orthogonal polarizations.

10. A display for showing a stereoscopic image, comprising:
- a screen for generating a first image having a pattern comprising alternating columns of N left-image pixels or sub-pixels and of N right-image pixels or sub-pixels and for generating a second image having a reversed pattern from the pattern of the first image;
- a parallel-strip barrier having alternating strips for blocking alternating columns of the first and second images;
- a tracking system for tracking a position of a viewer of the stereoscopic image; and
- a controller of the screen for shifting to the left or to the right, in relation to the strips of the barrier, the patterns of the first and second images by a number of image pixels or sub-pixels as a function of the position of the viewer.

11. The display of claim 10, wherein:
N is equal to 12 image sub-pixels;
the screen has a 1920-pixel horizontal resolution over a width of about 60 cm;
the barrier is positioned about 1 cm from the screen; and
a planned distance between the display and the viewer is about 60 cm;
whereby no shifting of the patterns of the first and second images occurs when the viewer is substantially positioned at the planned distance and substantially centered with the stereoscopic image.

12. The display of claim 10, wherein the barrier is placed in front of the screen.

13. The display of claim 10, wherein:
the screen is configured to generate the first and second images at orthogonal polarizations; and
alternating strips of the barrier have orthogonal polarizations.

14. The display of claim 10, wherein:
the screen is configured to generate the first image during a first of two timeslots;
the screen is configured to generate the second image during a second of the two timeslots; and
the barrier is configured to open and close alternating strips at successive timeslots; and
the screen is placed in front of the barrier.

15. The display of claim 10, wherein:
the screen is configured to generate the first image during a first of two timeslots;
the screen is configured to generate the second image during a second of the two timeslots;
the barrier is configured to open and close alternating strips at successive timeslots; and
the strips of the barrier are divided into sub-strips.

16. The display of claim 15, wherein the controller is configured to adjust a width of the strips of the barrier by associating a number of sub-strips.

17. The display of claim 15, wherein:
the barrier is configured to move its strips in continuous motion; and
the controller of the screen is configured to track the continuous motion of the strips of the barrier.

18. The display of claim 17, wherein the barrier is configured to shift its strips sideways by 1 or more sub-strips once every 1 or 2 timeslots.

19. The display of claim 10, wherein:
the screen is configured to generate the first image during a first of two timeslots;
the screen is configured to generate the second image during a second of the two timeslots; and
the barrier is configured to open and close alternating strips at successive timeslots;
the display further comprising:
an image source configured to:
- provide to the screen a composite image having, for each sub-pixel, a highest common luminance of corresponding sub-pixels of left and right images;
- provide the first image to the screen by subtracting, from each sub-pixel of the left image, a luminance of a corresponding sub-pixel of the composite image;
- provide the second image to the screen by subtracting, from each sub-pixel of the right image, a luminance of a corresponding sub-pixel of the composite image;

wherein:
the screen is configured to display the first image, the second image and the composite image over three successive timeslots; and
the parallel-strip barrier is configured to pass the composite image without blocking.

20. The display of claim 10, wherein:
the screen is configured to generate the first image during a first of two timeslots;
the screen is configured to generate the second image during a second of the two timeslots;
the barrier is configured to open and close alternating strips at successive timeslots;
the tracking system is configured to determine a distance between the stereoscopic image and the viewer's left eye and to determine a distance between the stereoscopic image and the viewer's right eye; and
the controller is configured to vary N over a width of the display so that:
- if the right eye is further away than the left eye, an increasing value of N is used from the left to the right of the display; and
- if the right eye is closer than the left eye, a decreasing value of N is used from the left to the right of the display.

* * * * *